(12) United States Patent
Kounavis et al.

(10) Patent No.: US 9,536,136 B2
(45) Date of Patent: Jan. 3, 2017

(54) MULTI-LAYER SKIN DETECTION AND FUSED HAND POSE MATCHING

(71) Applicant: Intel Corporation, Santa Clara, CA (US)

(72) Inventors: Michael Kounavis, Portland, OR (US); Aaron Debattista, Egham (GB)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/667,340

(22) Filed: Mar. 24, 2015

(65) Prior Publication Data

US 2016/0283784 A1 Sep. 29, 2016

(51) Int. Cl.
*G06K 9/00* (2006.01)
*G06K 9/62* (2006.01)
*G06T 7/00* (2006.01)

(52) U.S. Cl.
CPC ......... *G06K 9/00355* (2013.01); *G06K 9/6201* (2013.01); *G06K 9/6218* (2013.01); *G06K 9/6267* (2013.01); *G06T 7/004* (2013.01); *G06T 7/0081* (2013.01); *G06T 2207/10004* (2013.01)

(58) Field of Classification Search
USPC ......................................................... 382/103
See application file for complete search history.

(56) References Cited

U.S. PATENT DOCUMENTS

| 2002/0181773 A1* | 12/2002 | Higaki | G06K 9/00335 382/190 |
| 2008/0181499 A1 | 7/2008 | Yang et al. | |
| 2009/0027337 A1* | 1/2009 | Hildreth | G06F 3/011 345/158 |
| 2009/0315740 A1* | 12/2009 | Hildreth | G06F 3/017 341/20 |

(Continued)

FOREIGN PATENT DOCUMENTS

| CN | 102789568 A | 11/2012 |
| EP | 2680228 A1 | 1/2014 |

OTHER PUBLICATIONS

Amanatiadis, A. et al., "Evaluation of Shape Descriptors for Shape-Based Image Retrieval", IET Image Processing, 5(5), (Aug. 2011), 493-499.

(Continued)

*Primary Examiner* — Alex Liew
(74) *Attorney, Agent, or Firm* — Schwegman Lundberg & Woessner, P.A.

(57) ABSTRACT

Embodiments of a system and methods for skin detection and pose determination of a hand in an image are generally described herein. A method for may include detecting skin pixels in an image using a multi-layer skin filter and classifying the skin pixels into a set of foreground skin pixels and a set of background skin pixels. The method may include storing information about the set of background skin pixels in a persistent memory. The method may include determining a set of features from the set of foreground skin (Continued)

pixels, and clustering features from the set of features to create a set of hand pose descriptors. The method may include determining a set of candidate hand pose region descriptors and a set of candidate hand pose contour descriptors that match the set of hand pose descriptors and detecting a valid hand pose using the sets of candidate descriptors.

25 Claims, 13 Drawing Sheets

(56) References Cited

U.S. PATENT DOCUMENTS

| | | | | |
|---|---|---|---|---|
| 2012/0069168 | A1* | 3/2012 | Huang | G06F 3/017 348/77 |
| 2012/0140987 | A1* | 6/2012 | Singh | G06K 9/48 382/103 |
| 2013/0088426 | A1* | 4/2013 | Shigeta | G06F 3/017 345/156 |
| 2013/0278504 | A1 | 10/2013 | Tong et al. | |
| 2015/0193656 | A1 | 7/2015 | Kounavis et al. | |
| 2015/0286859 | A1* | 10/2015 | Zaytsev | G06K 9/00355 382/103 |

OTHER PUBLICATIONS

Chai, Youngjoon, et al., "Homogeneity Based Background Subtraction for Robust Hand Pose Recognition Focusing on the Digital Game Interface", Computer Graphics, Imaging and Visualisation (CGIV 2007), (2007), 6 pgs.

Chang, Chin-Chen, et al., "Hand Pose Recognition Using Curvature Scale Space", Proceedings. 16th International Conference on Pattern Recognition, vol. 2, (2002), 386-389.

Chen, Yen-Ting, et al., "Multiple-angle Hand Gesture Recognition by Fusing SVM Classifiers", Proceedings of the 3rd Annual IEEE Conference on Automation Science and Engineering, Scottsdale, AZ, Sep. 22-25, 2007, (2007), 527-530.

Choi, Junyeong, et al., "Hand Shape Recognition Using Distance Transform and Shape Decomposition", 2011 18th IEEE International Conference on Image Processing, (2011), 3605-3608.

Dawood, Ahmad Yahya, et al., "Adaptive Skin Color Model for Hand Segmentation", International Conference on Computer Applications and Industrial Electronics (ICCAIE), (Dec. 2010), 486-489.

Dollar, Piotr et al., "Fast Feature Pyramids for Object Detection", IEEE Transactions on Pattern Analysis and Machine Intelligence, 38(8), (Jan. 16, 2014), 1532-1545.

Feng, Kai-Ping, et al., "Static Hand Gesture Recognition Based on HOG Characters and Support Vector Machines", 2013 2nd International Symposium on Instrumentation and Measurement, Sensor Network and Automation (IMSNA), (2013), 936-938.

Froba, Bernhard, et al., "Faced Detection with the Modified Census Transform", Proceesings of Sixth IEEE International Conference on Automatic Face and Gesture Recognition, (May 2004), 91-96.

Isaacs, Jason, et al., "Optimized Wavelet Hand Pose Estimation for American Sign Language Recognition", Congress on Evolutionary Computation, CEC2004, (2004), 797-802.

Jones, Michael J., et al., "Statistical Color Models with Application to Skin Detection", IEEE Computer Society Conference on Computer Vision and Pattern Recognition, (1999), 274-280.

Kolsch, Mathias, et al., "Analysis of Rotational Robustness of Hand Detection with a Viola-Jones Detector", Proceedings of the 17th International Conference on Pattern Recognition, vol. 3, (Aug. 2004), 107-110.

Li, Cheng, et al., "Pixel-level Hand Detection in Ego-Centric Videos", Computer Vision and Pattern Recognition, (2013), 3570-3577.

Li, Hui, et al., "Static Hand Gesture Recognition Based on HGO with Kinect", 2012 4th International Conference on Intelligent Human-Machine Systems and Cybernetics, (2012), 271-273.

Lienhart, Rainer, et al., "Empirical Analysis of Detection Cascades of Boosted Classifiers for Rapid Object Detection", MRL Technical Report, Proceedings of the 25th DAGM Symposium on Pattern Recognition, (2002), 7 pgs.

Lu, Guojun, et al., "Region-based shape representation and similarity measure suitable for content-based image retrieval", Multimedia Systems, 7, (1999), 165-174.

MacLean, James, et al., "Fast Hand Gesture Recognition for Real-Time Teleconferencing Applications", Proceedings. IEEE ICCV Workshop on Recognition, Analysis, and Tracking of Faces and Gestures in Real-Time Systems, (2001), 133-140.

Mihalache, Constantina R., et al., "Hand pose estimation using HOG features from RGB-D data", 2013 17th International Conference System Theory, Control and Computing (ICSTCC), (2013), 6 pgs.

Minnen, David, et al., "Towards Robust Cross-User Hand Tracking and Shape Recognition", 2011 IEEE International Conference on Computer Vision Workshops, (2011), 1235-1241.

Mittal, Arpit, et al., "Hand detection using multiple proposals", University of Oxford, Technical Report, (2011), 11 pgs.

Mo, Zhenyao, et al., "Real-time Hand Pose Recognition Using Low-Resolution Depth Images", IEEE Computer Society Conference on Computer Vision and Pattern Recognition, (2006), 1499-1505.

Morerio, Pietro, et al., "Hand Detection in First Person Vision", 16th International Conference on Information Fusion (FUSION), (Jul. 2013), 1502-1507.

Nagi, Jawad, et al., "Max-Pooling Convolutional Neural Networks for Vision-based Hand Gesture Recognition", IEEE International Conference on Signal and Image Processing Applications (ICSIPA), (Nov. 2011), 342-347.

Ng, Chan W., et al., "Gesture Recognition via Pose Classificationl", Proceedings. 15th International Conference on Pattern Recognition, (2000), 699-704.

Nickel, Kai, et al., "Visual recognition of pointing gestures for human-robot interaction". Image and Vision Computing, 25(12), (Dec. 3, 2007), 1875-1884.

Nummiaro, Katja, et al., "Object Tracking with an Adaptive Color-Based Particle Filter", Pattern Recognition: Proceedings of 24th DAGM Symposium Zurich, Switzerland, vol. 2449, Springer Berlin Heidelberg, (2002), 353-360.

Papageorgiou, Constantine P., et al., "A General Framework for Object Detection", Sixth International Conference on Computer Vision, (1998), 555-562.

Parker, J. R., et al,, "Finger Recognition for Hand Pose Determination", In: IEEE International Conference on Systems; Man and Cybernetics, (2009), 18 pgs.

Preez. P. et al., "Color-Based Probabilistic Tracking", Computer Vision: Proceedings of 7th European Conference on Computer Vision Copenhagen, Denmark (Part 1), vol. 2350, Springer Berlin Heidelberg, (2002), 661-675.

Raheja, Jagdish Lal, et al., "Real-Time Robotic Hand Control Using Hand Gestures", Second International Conference on Machine Learning and Computing (ICMLC), (Feb. 2010), 12-16.

Romero, Javier, et al., "Monocular Real-Time 3D Articulated Hand Pose Estimation", 9th IEEE-RAS International Conference on Humanoid Robots, (Dec. 2009), 87-92.

Roussos, Anastasios; et al., "Dynamic Affine-Invariant Shape-Appearance Handshape Features and Classification in Sign Language Videos", Journal of Machine Learning Research, 14, (2013), 1627-1663.

Saxe, David, et al., "Toward Robust Skin Identification in Video Images", Proceedings of the Second International Conference on Automatic Face and Gesture Recognition, (1996), 379-384.

Schwarz, Christopher, et al., "Segment-Based Hand Pose Estimation", Proceedings of the Second Canadian Conference on Computer and Robot Vision (CRV'05), (2005), 8 pgs.

Serra, Giuseppe, et al., "Hand Segmentation for Gesture Recognition in EGO-Vision", Proceedings of the 3rd ACM international workshop on Interactive multimedia on mobile & portable devices, (2013), 31-36.

(56) References Cited

OTHER PUBLICATIONS

Sigal, Leonid, et al., "Estimation and Prediction of Evolving Color Distributiosn for Skin Segemetation Under Varying Illumination", IEEE Conferenceon Computer Vision and Pattern Recognition, vol. 2, (Mar. 2000), 152-159.

Sigal, Leonid, et al., "Skin Color-Based Video Segmentation under Time-Varying Illumination", IEEE Transactions on Pattern Analysis and Machine Intelligence, 26(7), (Jul. 2004), 862-877.

Sorge, Salvatore, et al., "Real-time Hand Pose Recognition Based on a Neural Network Using Microsoft Kinect", 2013 Eighth International Conference on Broadband, Wireless Computing, Communication and Applications, (2013), 344-350.

Soriano, Maricor, et al.; "Skin detection in video under changing illumination conditions", Proceedings, 15th International Conference on Pattern Recognition, (2000), 839-842.

Stauffer, Chris, et al., "Adaptive Background Mixture Models for Real-time Tracking", Proceedings 1999 IEEE Computer Society Conference on Computer Vision and Pattern Recognition, 2(2), (Jun. 1999), 246-52.

Storring, Moritz, et al., "Skin Colour Detection Under Changing Lighting Conditions", 7th Symposium on Intelligent Robotics Systems, (1999), 9 pgs.

Suryanarayan, Poonam, et al., "Dynamic Hand Pose Recognition using Depth Data", 2010 International Conference on Pattern Recognition, (2010), 3105-3108.

Takimoto, Hironori, et al., "Classification of Hand Postures Based on 3D Vision Model for Human-Robot Interaction", 19th IEEE International Symposium on Robot and Human Interactive Communication, (2010), 292-297.

Tang, Cheng, et al., "Hand Tracking and Pose Recognition via Depth and Color Information", Proceedings of the IEEE International Conference on Robotics and Biomimetics, (Dec. 2012), 1104-1109.

Terrillon, Jean-Christophe, et al., "Comparative Performance of Different Chrominance Spaces for Color Segmentation and Detection of Human Faces in Complex Scene Images", Vision Interface, (May 1999), 180-187.

Viola, P. et al., "Robust Real-time Object Detection", International Journal of Computer Vision, (2001), 1-25.

Wu, Tianrui, et al., "Skin-Color based Particle Filtering for Human Face Tracking", IEEE Conference on Cybernetics and Intelligent Systems, (Sep. 2008), 728-733.

Yang, Jie, et al., "Skin-Color Modeling and Adaptation", Proceedings of the Third Asian Conference on Computer Vision, vol. 2, (1998), 687-694.

Yang, Ming-Hsuan, et al., "Gaussian Mixture Model for Human Skin Color and Its Applications in Image and Video processing", University of Illinois at Urbana-Champaign, Technical Report, (1998), 9 pgs.

Yin, Xiaoming, et al., "Hand Gesture Segmentation, Recognition and Application", Proceedings of 2001 IEEE International Symposium on Computational Intelligence in Robotics and Automation, Jul. 29-Aug. 1, 2001, Banff, Alberta, Canada, (2001), 438-443.

Zhang, Dengsheng, et al., "A Comparative Study of Fourier Descriptors for Shape Representation and Retrieval", The 5th Asian Conference on Computer Vision, (2002), 6 pgs.

Zhang, Dengsheng, et al., "Enhanced Generic Fourier Descriptors for Object-Based Image Retrieval", IEEE International Conference on Acoustics, Speech, and Signal Processing, vol. 4, (May 2002), IV-3668-IV-3671.

Zhang, Dengsheng, et al., "Review of shape representation andd escription techniques", Pattern Recognition, 37(1), (Jan. 2004), 1-19.

Zhao, Yafei, et al. "A Real-time Hand Gesture Recognition Method", 2011 International Conference on Electronics, Communications and Control (ICECC), (2011), 2475-2478.

Zhu, Xiaojin, et al., "Segmenting Hands of Arbitrary Color", Proceedings of Fourth IEEE International Conference on Automatic Face and Gesture Recognition, (Mar. 2000), 446-453.

International Application Serial No. PCT/US2016/019316, International Search Report mailed Jun. 8, 2016, 3 pgs.

International Application Serial No. PCT/US2016/019316, Written Opinion mailed Jun. 8, 2016, 6 pgs.

* cited by examiner

CrCb locus of mixture 1

Skin pixels of mixture 1

CrCb locus of mixture 2

Skin pixels of mixture 2

CrCb locus of mixture 3

Skin pixels of mixture 3

CrCb locus of mixture 4

Skin pixels of mixture 4

CrCb locus of all mixtures

Skin pixels of all mixtures

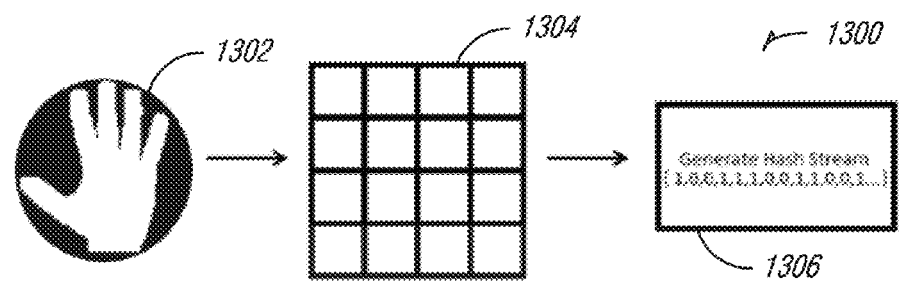
*FIG. 13*
*FIG. 14A*   *FIG. 14B*   *FIG. 14C*   *FIG. 14D*
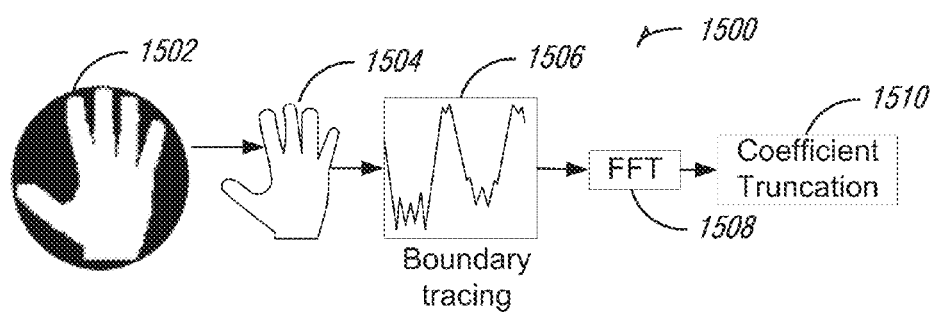
*FIG. 15*

MULTI-LAYER SKIN DETECTION AND FUSED HAND POSE MATCHING

BACKGROUND

Image-based solutions for gesture recognition or hand pose detections are becoming more sophisticated every year. Current solutions include using global color models to detect skin. An issue with this solution may include a high error rate. Other solutions for detecting hand poses use trained regression models. A drawback of trained regression models is the large amount of resources expended, time needed, or difficulty in training the models. Still other approaches include using skin information to directly detect hand poses. This approach may not work with all skin colors and may require significant resources or time.

SUMMARY

This system described herein includes a group of techniques for enhancing the quality of gesture recognition systems based on, but not limited to, a single two dimensional camera. Techniques may include a novel skin detection method combined with an improved background subtraction technique that helps with detecting skin regions in an image more accurately than the state of the art. Second, an improved clustering technique helps with separating skin regions from each other, thus isolating the skin pixels of the palm from other skin pixels such as those of faces or body torsos. Third, a fused pose matching technique employs two different techniques, which are region-based matching (e.g., using K-Nearest Neighbor (KNN)) and contour-based matching (e.g., using Support Vector Machines (SVMs)) to associate skin clusters with hand poses thus improving detection rates and reducing false positive rates to almost zero. The techniques used herein result in better hand tracking quality and recognition rates in several environments. The number of poses the system may track and detect is configurable. Functioning of computer system is improved when running instructions that perform the techniques described herein. The improved functioning includes increasing processing speed, decreasing resource use, and other improvements detailed below.

In an example, the user may register with the system before beginning its operation. User registration is a pose matching process where the user raises his/her hand and skin pixels are identified. These skin pixels are used as seed values for computing a multiplicity of skin color models. These color models are further used by a skin detection technique in an on-line real-time mode. In an example, the camera may remain static or semi-static. For example, small movements may be tolerated, but extensive panning or zooming may be undesirable. The background subtraction technique may further prune background pixels which may be confused with skin. The techniques described herein have the ability to track the hand in any location in an image regardless of the hand pose shown and also to detect a wider set of poses without employing heuristic techniques specific to the pose being detected.

In an example, the techniques described below may demonstrate a very small false positive rate. This is important for overall system reliability. This is mainly due to the fusion of two different pose matching techniques that perform classification based on different aspects of a pose. These aspects are the regions of coverage by skin pixels in a pose and the contours of a pose. Due to these the system rarely reacts falsely to background or other gesture movements. Another advantage of these techniques is that they allow for a much wider set of poses to be detected. This may happen without the use of custom heuristics per pose. When compared to other solutions that depend on the availability of 3D data, potential power issues coming from using a 3D camera may be avoided.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 13 illustrates generally a system for bit grid and hash stream generation for region-based matching in accordance with some embodiments.

FIGS. 14A-14D illustrate generally diagrams showing blob grid generation for region-based matching in accordance with some embodiments.

FIG. 15 illustrates generally a diagram of a technique for contour-based matching in accordance with some embodiments.

DETAILED DESCRIPTION

Figure 1:
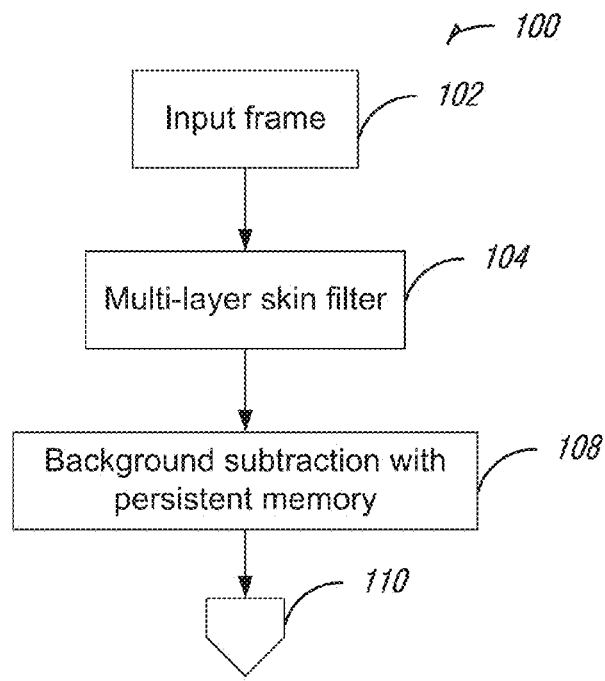
FIG. 1 illustrates generally a flowchart showing a technique for skin detection in accordance with some embodiments.

Skin detection may be based on several design principles. One principle is that successful skin filtering is accomplished by using multiple luminance-invariant color models together where a color model is used by a separate weak color-based classifier. By stacking several weak color classifiers together a stronger color classifier may be designed that better approximates the performance of an ideal skin detector. By using luminance-invariant color models some degree of tolerance to light changes may be allowed, while still removing as many background pixels as possible.

A second principle guiding the design of skin detector may include color models that are computed or updated from previous models periodically from the skin pixels of matched poses. This approach is potentially simpler, more reliable, and not as restrictive as other options. This approach may be computationally simpler as it may occur less frequently (e.g., in the seconds or minutes time scale) compared to histogram back projection or dynamic motion model updating, which typically occur on a frame by frame basis. In another example, periodically determining color models may be more reliable than histogram back projection as it may use all skin pixels coming from an identified pose as opposed to the pixels determined by a back projected histogram. In yet another example, it may not be as restrictive or as mathematically complex as using a dynamic motion model for the skin color distribution, since dynamic motion modeling may be based on assumptions about skin color changes which may not be true.

A third principle in the design of a skin detector may include combining skin detection with a background subtraction algorithm for further removing some background pixels. The background pixels removed this way are those that demonstrate 'true' color overlaps with skin, such as those that have identical red green blue (RGB) values with skin pixels. In an example, a background subtraction algorithm models the RGB distribution of each pixel separately using a Gaussian Mixture Model. Such RGB distribution may be learned over time. Rapid changes in the RGB values of pixels indicate motion and hence help with classifying pixels as foreground. Pixels for which observed changes in RGB values occur constantly inside some limited range are classified as background. In an example, a persistent memory mechanism may be added that may allow for recalling the background state of pixels even if such pixels are occluded by moving objects. For example, movements in the foreground may occur without employing background learning, even if such movements temporarily cover background pixels.

In an example, a clustering algorithm may be used for grouping together features coming from skin pixels. Blob features may include visual structures that resemble a Gaussian kernel on a hand pose. Using blob features instead of pixels for descriptor generation and pose matching may be preferable for several reasons. First, blob features are fewer in number than pixels and they may be processed more quickly. Second, blob features may be used for reconstructing the hand silhouette more reliably as compared to pixels, compensating for skin holes or missing pixels in the pose. Third, blob features may be used for identifying and pruning weak clusters resulting mostly from background collisions with skin.

Clustering may help features coming from skin pixels of disjoined opaque areas to be grouped separately. Such separation helps with isolating the features of hands from the features of faces or other skin areas and the generation of descriptors for hand pose matching. A robust k-means variant may be used where the number of clusters k and initial cluster centroids are defined by a separate stage. In an example, the skin masks coming from the skin detection stage may go through a number of morphology operations and a connected component labeling process. The number of the resulting connected components is the optimal k and the centroids of the connected components the starting centroids for the k-means algorithm. In another example, a greedy hierarchical clustering stage may determine islands of neighboring blob features which satisfy a proximity criterion. The resulting number of islands is the optimal k and the island centroids are the starting centroids for the k-means algorithm.

After feature clusters are determined, clusters may be further processed for descriptor generation and pose matching. In an example, two different pose matching techniques may run independently to minimize the probability of detecting false positives as hand poses. The first of the two pose matching techniques is based on generating bit grid descriptors from the skin masks and blob features of clusters and then comparing these descriptors with a multiplicity of pregenerated descriptors for many different hand poses stored in a database. In an example, comparisons are performed using the Hamming distance metric and a K-Nearest Neighbor (KNN) technique. In this example, this pose matching technique may be referred to as region-based matching. The second of the two pose matching techniques may include generating Fourier descriptors from the contours of cluster areas and then classifying these descriptors as associated with hand poses with the help of trained Support Vector Machines (SVMs). In another example, this pose matching technique may be referred to as contour-based matching. The results of region and contour-based matching are fused together using a voting scheme.

In an example, multiple ellipse regions may be used to approximate the skin locus of color models, wherein a skin locus may include points in a color space associated with a skin region. Color loci based on multiple ellipse regions may be more accurate than a single ellipse and more efficient than loci described using arbitrary shapes, as it is not very costly to detect if a point is inside an ellipse region.

In an example, various diagrams in various FIGs. may be inverted for ease of viewing (e.g., black dots on a white field). In particular, aspects of diagrams 200, 500A-500K, 700, 1400A-1400D, 1500, 1600A-1600B, and 1800 from FIGS. 2, 5A-5D, 7, 14A-14D, 15, 16A-16B, and 18 may be inverted or altered for ease of viewing.

FIG. 1 illustrates generally a flowchart showing a technique 100 for skin detection in accordance with some embodiments. The technique 100 may include determining pixels from an image that are skin pixels and pixels from the image that are not skin pixels. For example, an input frame 102 of the image may go through a multi-layer skin filter 104 to separate skin pixels from background pixels. The multi-layer skin filter 104 may not distinguish between pixels which are part of skin and background pixels which have identical colors as skin pixels. To address this issue, the technique 100 includes implementing a background subtraction with persistent memory 108, which may further separate skin pixels in the foreground from pixels in the static background. The background subtraction with persistent memory 108 may use a static camera. The technique 100 may include continuing to a pose matching technique at operation 110, which is further described below in relation to FIG. 8. In an example, technique 100 may include using the multi-layer skin filter 104 first and using the background subtraction with persistent memory 108 second. In another example, the order may be reversed.

Figure 2:
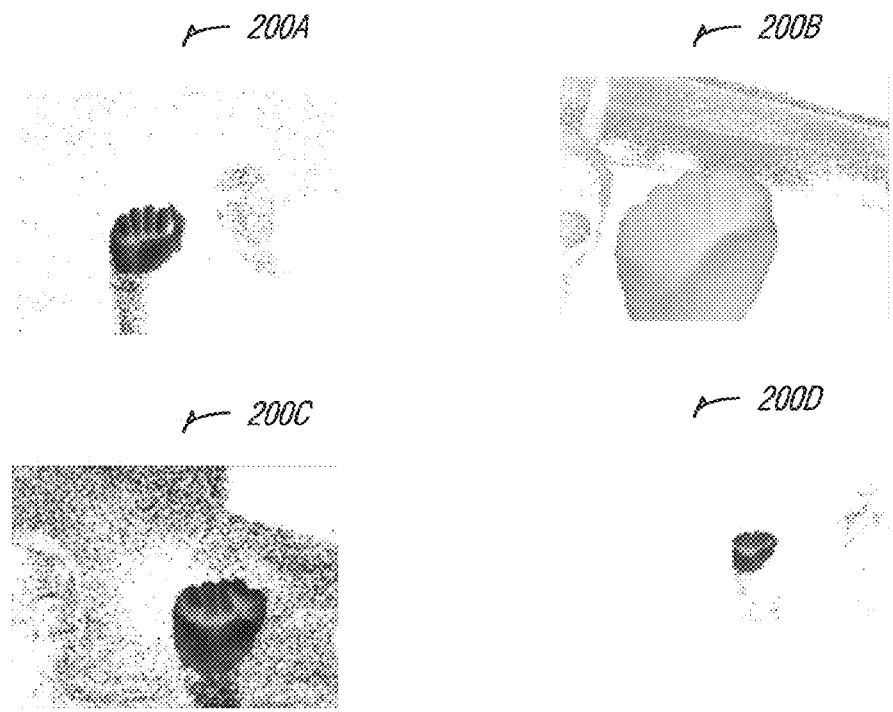
FIG. 2 illustrates generally diagrams showing detected skin pixels in accordance with some embodiments.

In an example, an ideal skin filter may include successfully identifying all skin pixels in an image. Pixels that are not removed by an ideal skin filter may include those pixels in the background that have identical RGB color values as skin pixels. The background pixels with identical RGB color values as skin pixels may be referred to as true color overlaps. Examples of true color overlaps are shown in FIG. 2. FIG. 2 illustrates generally diagrams 200A-200D showing detected skin pixels in accordance with some embodiments. In many images, true color overlaps are few and often isolated, as shown diagram 200D, or may be in proximity to the hand as in diagram 200A. Such color overlaps may be easily distinguished from larger opaque skin areas via mechanisms that identify and prune small skin clusters. In some cases, true color overlaps may be large, forming opaque areas in the background which potentially interfere with the pose matching process, as shown diagrams 200B and 200C.

Further segmentation mechanisms beyond the filters that operate on color information may be used to aid in filtering the true color overlaps in video frames. Using color filters and filters that combine color and motion information may include a stronger hand segmentation system that may isolate the hand and other skin areas while removing true color overlaps. The details of a multi-layer skin filter and a background subtraction system that addresses the presence of true color overlaps is described below.

Figure 3:
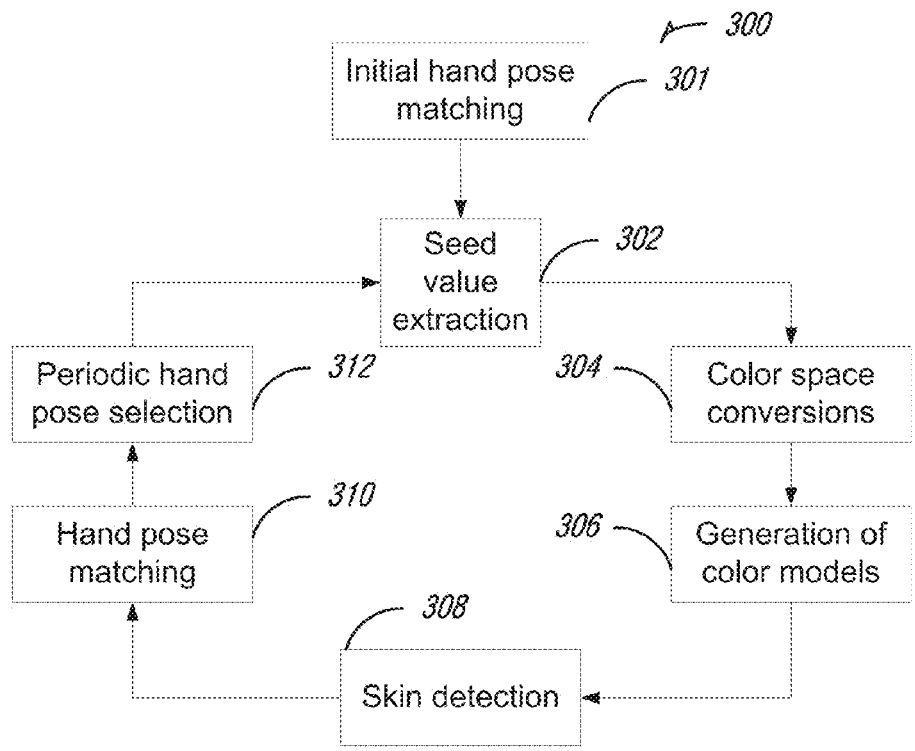
FIG. 3 illustrates generally a flowchart showing a technique for color model updating in accordance with some embodiments.

FIG. 3 illustrates generally a flowchart showing a technique 300 for color model updating in accordance with some embodiments. In an example, the multi-layer skin filter uses a multiplicity of color models for skin which are computed periodically from seed values. In an example, parametric skin detection may be used. For example, skin color models may be computed from seed values which are skin pixels.

The periodic color model update process may include computing skin color distributions that may successfully predict the chrominance properties of a user's skin over a limited period of time. The color model update process may allow for rapid changes in luminance (e.g., moving a hand in and out of a dark area) to occur without disruptions in the quality of the skin detection. To handle long term changes in skin chrominance, a system may re-compute color models for skin periodically. The period used may be in the order of seconds to minutes. To handle rapid changes in luminance effectively, the system uses lightness-invariant color models. Lightness-invariant color models are defined in color spaces that separate the chrominance from the luminance components. Examples include the 'Hue-Saturation-Value' (HSV) color space and the 'Y luminance-Chromatic red-Chromatic blue' (YCrCb) space. HSV allows the value (V) component to be excluded from a color description. Similarly YCrCb allows the Y luminance component to be excluded from a color description.

In an example, during a user registration phase, a pose matching process may identify a hand pose 301 and extract skin pixels from this hand pose. These skin pixels may be referred to as seed values (e.g., seed value extraction 302). This may be a one-time operation which allows the technique to initialize the color models used for skin detection or may be repeated. The seed values extracted may undergo color space conversions 304 and the resulting values may be used for computing a multiplicity of color models 306. These color models may be valid for a current period of time. The color models computed this way are used in a skin detection operation 308 that helps with performing color-based hand tracking (e.g., periodic hand pose selection 312) and hand pose matching 310. At the end of the period, a selected hand pose or hand cluster is used for a next seed value extraction operation. The seed values extracted this way are further used for updating the color models of the technique. The new models computed may replace the previous models for the next period of time. The process is further repeated. During seed value extraction 302, some pixels around the contour of a detected pose may be excluded from being used as seeds. For example, the pixels may be excluded from being used as seeds to compensate for some possible error in the detection of the hand pose contour.

In an example, color model computations are performed using an Expectation Maximization (EM) technique. In another example, alternative methods such as on-line k-means clustering may be used. Expectation maximization models a probability density function as a linear combination of Gaussian functions referred to as Gaussian mixtures. Such a model may be called a Gaussian Mixture Model (GMM). For a set of input values (e.g., seeds) EM computes mixture parameters that result in a density function which maximizes the likelihood of these seed values. The probability density function used by EM is shown in Eq. 1.

$$Pr(\tilde{x}; \theta) = \sum_{i=1}^{G} \frac{c_i}{\sqrt{(2\pi)^d \cdot |\Sigma_i|}} \cdot e^{-\frac{(\tilde{x}-\tilde{\mu}_i)^T \cdot (\Sigma_i)^{-1} \cdot (\tilde{x}-\tilde{\mu}_i)}{2}} \quad \text{Eq. 1}$$

Where x is an input vector of dimensionality d and θ is the Gaussian mixture model used by the technique. For example, if the Hue-Saturation (HS) or Chromatic red-Chromatic blue (CrCb) color spaces are used, d=2. The Gaussian mixture model θ further comprises a number of Gaussian mixtures G where the i-th Gaussian mixture is associated with a GMM coefficient $C_i$, a mean value vector $\tilde{\mu}_i$ and a covariance matrix $\Sigma_i$. The GMM coefficients $C_i$, the mean value vectors $\tilde{\mu}_i$, and the covariance matrices $\Sigma_i$ for $1 \leq i \leq G$, are the parameters of the model θ.

The EM technique may make an initial guess for the parameters of the Gaussian mixture model. The speed of convergence of EM depends on how good the initial guess is. Once an initial guess is made the technique updates the parameters of the model taking into account seed values $\tilde{x}_1$, $\tilde{x}_2, \ldots, \tilde{x}_n$. First, the i-th GMM coefficient is updated to a value $\hat{c}_i$, which is the probability that the event characterized by the density of Eq. 1 is true due to the i-th mixture being true. This probability is averaged across seed values $\tilde{x}1$, $\tilde{x}_2, \ldots, \tilde{x}_n$:

$$\hat{c}_i = \frac{1}{n} \cdot \sum_{j=1}^{n} \hat{c}_{ij}, \quad \hat{c}_{ij} = \frac{\frac{c_i}{\sqrt{(2\pi)^d \cdot |\Sigma_i|}} \cdot e^{-\frac{(\tilde{x}_j - \mu_i)^T \cdot (\Sigma_i)^{-1} \cdot (\tilde{x}_j - \mu_i)}{2}}}{Pr(\tilde{x}_j; \theta)} \quad \text{Eq. 2}$$

Second, the mean value vector of the i-th mixture is updated to a value $\hat{\mu}_i$ which is equal to the mean output value of a system characterized by the density of Eq. 1 where only the i-th mixture is true. The mean value is taken across seed values $\tilde{x}_1, \tilde{x}_2, \ldots, \tilde{x}_n$:

$$\hat{\mu}_i = \frac{\sum_{j=1}^{n} \hat{c}_{ij} \cdot \tilde{x}_j}{\sum_{j=1}^{n} \hat{c}_{ij}} \quad \text{Eq. 3}$$

Next, the covariance matrix of the i-th mixture is updated to a value $\hat{\Sigma}_i$ which is equal to the mean covariance matrix of the output of a system characterized by the density of Eq. 1 where only the i-th mixture is true. The covariance matrix is computed as an average across seed values $\tilde{x}_1, \tilde{x}_2, \ldots, \tilde{x}_n$:

$$\hat{\Sigma}_i = \frac{\sum_{j=1}^{n} \hat{c}_{ij} \cdot (\tilde{x}_j - \tilde{\mu}_i) \cdot (\tilde{x}_j - \tilde{\mu}_i)^T}{\sum_{j=1}^{n} \hat{c}_{ij}} \quad \text{Eq. 4}$$

The EM technique may end if the improvements in the likelihood function computed over the seed values are smaller than a threshold. To speed up the convergence of EM a heuristic technique for initialization may be used. In an example, an initial EM mean value vectors and covariance matrices may be defined from mean and standard deviation parameters of the seed values computed in each dimension. This technique may indicate the statistical properties of the seed values that are the best values to indicate which model parameters are good guesses for the initialization of EM.

In an example, the number of mixtures may be set to a value $n = q^d$ for some odd number q. In an example, q may equal 3 and d may equal 2 and therefore n may equal 9 mixtures. The number q may reflect how many values from each dimension are selected to construct the initial mean value vectors of the model θ. GMM coefficients are all initialized to 1/n. The initial mean value vectors of θ are constructed from average values $\mu_j^{(d)}$ and standard deviation values $\sigma_j^{(d)}$, $1 \leq j \leq d$ computed from the seed values across the d dimensions. In an example, p, $\Delta\sigma_j$ and $\mu_{j,k}^{(d)}$ may be defined by Eq. 5 for some indexes j and k:

$$p = \left\lfloor \frac{q}{2} \right\rfloor, \Delta\sigma_j = \frac{\sigma_j^{(d)}}{p}, \mu_{j,k}^{(d)} = \mu_j^{(d)} + k \cdot \Delta\sigma_j \text{ where} \quad \text{Eq. 5}$$

$$1 \leq j \leq d, -p \leq k \leq p$$

The initial mean value vectors of θ are those vectors that take all possible combinations of values $\mu_{j,k}^{(d)}$ in each of the dimensions indexed by j where index k ranges between $-p$ and p as in Eq. 5. Since index k may take q different values there are at most $q^d$ mean value vectors which are as many as the mixtures.

$$\tilde{\mu}_1 = [\mu_{1,-p}^{(d)} : \mu_{2,-p}^{(d)} : \ldots : \mu_{d,-p}^{(d)}], \quad \text{Eq. 6}$$
$$\tilde{\mu}_2 = [\mu_{1,-p+1}^{(d)} : \mu_{2,-p}^{(d)} : \ldots : \mu_{d,-p}^{(d)}],$$
$$\ldots,$$
$$\tilde{\mu}_d = [\mu_{1,p}^{(d)} : \mu_{2,p}^{(d)} : \ldots : \mu_{d,p}^{(d)}]$$

In an example, Eqs. 5 and 6 may include the initial mean value vectors of model θ defined from equally spaced values centered on the mean values computed in each dimension and differing from the mean values by at most the standard deviation of each dimension. In another example, the maximum difference may be the standard deviation of each dimension times a scaling factor.

The covariance matrix $\Sigma_i$ of the i-th mixture of θ is similarly initialized from the standard deviation values of each dimension:

$$\Sigma_i = \begin{pmatrix} \frac{2}{\Delta\sigma_1^2} & 0 & & 0 \\ 0 & \frac{2}{\Delta\sigma_2^2} & \ldots & 0 \\ \vdots & & \ddots & \vdots \\ 0 & 0 & \ldots & \frac{2}{\Delta\sigma_d^2} \end{pmatrix} \quad \text{Eq. 7}$$

In another example, an on-line k-means clustering technique may be used in place of EM. On-line k-means clustering may trade off accuracy for efficiency in defining Gaussian distributions using simpler clustering operations on the seed values. For a seed value a decision is made whether the seed is part of an existing value cluster. Such decision is based on the distance between a seed and a cluster center. If a seed is part of a cluster the seed is added to the cluster and the cluster center and standard deviation are updated using a low pass filtering mechanism:

$$\hat{\mu}_i = (1-\rho) \cdot \tilde{\mu}_i + \rho \cdot \tilde{x}_j, \hat{\sigma}_i^2 = (1-\rho) \cdot \sigma_i^2 + \rho \cdot (\tilde{x}_j - \tilde{\mu}_i)^T (\tilde{x}_j - \tilde{\mu}_i) \quad \text{Eq. 8}$$

Where $\tilde{x}_j$ is an input seed value and p is a low pass filtering parameter. If a seed is not part of a cluster, a new cluster is created having the seed in its center and standard deviation set to a fixed value. The resulting clusters computed from Eq. 8 and the seed values determine the Gaussian mixtures of the final model. The resulting mixtures are as many as the clusters. The mean value vectors of the mixtures are the cluster centers and the covariance matrices of the mixtures are determined from the standard deviation parameters of the clusters.

Eq. 8 may not require storing the seed values associated with a cluster, hence the term 'on-line k-means'. In another example, a variant of this technique may be used where the seed values of a cluster are stored. In this case the centers of the clusters may be more accurately computed as the centroids of the stored values of clusters. These include the seed values which are being added each time. Moreover, principal component analysis on the elements of the resulting clusters may help with better determining the covariance matrices of the mixtures as compared to using Eq. 8.

In an example, the chrominance properties of the skin tone may not change between color model updates, but luminance properties may. In an example, to anticipate sudden changes in skin luminance, color spaces may be used that exclude the luminance component from the description of colors, such as the two dimensional CrCb and HS spaces.

Two dimensional spaces like CrCb and HS may act as color hash functions mapping much larger color spaces of, for example, $256^3=16,777,216$ values to sets of smaller number of colors (e.g., $256^2=65536$ colors) The use of such mappings may introduce color collisions between skin and the background. Their number may be much larger than the true color overlaps present in a frame. To avoid such color collisions a layered architecture for a skin filter may be applied.

Figures 4A, 4B:
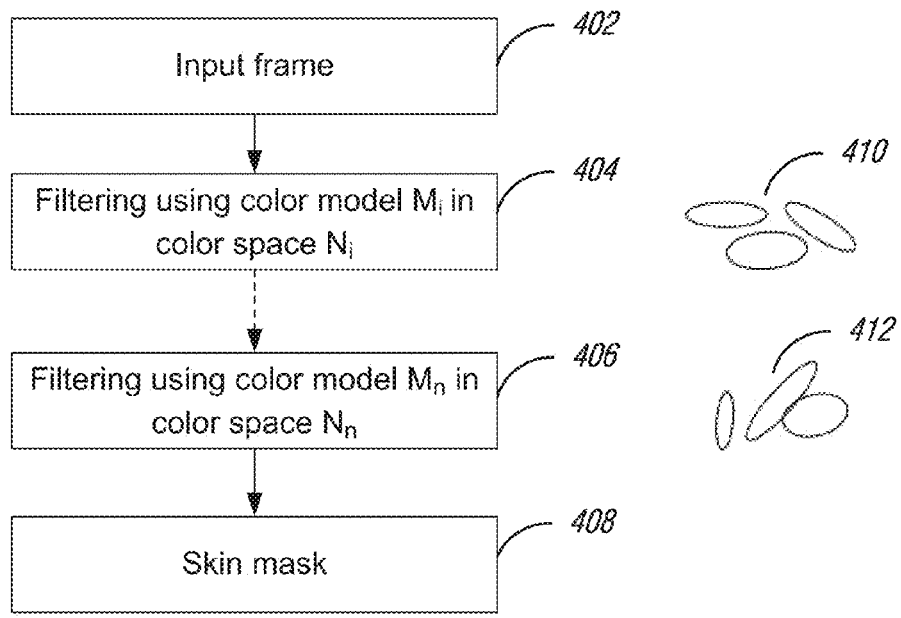
FIG. 4A illustrates generally a flowchart showing a technique for skin filtering in accordance with some embodiments.
FIG. 4B illustrates generally color ellipse representations corresponding to operations in the technique of FIG. 4A in accordance with some embodiments.
Figure 5A:
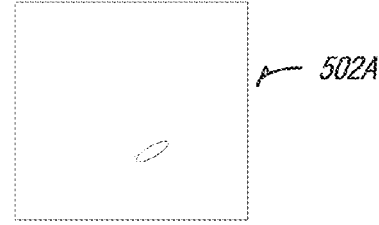
FIGS. 5A-5J illustrate generally diagrams showing skin color modeling in accordance with some embodiments.
Figure 5B:
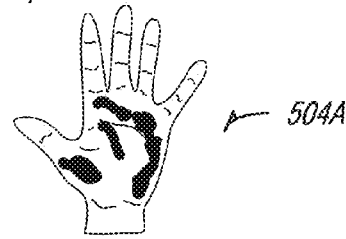
Figure 5C:
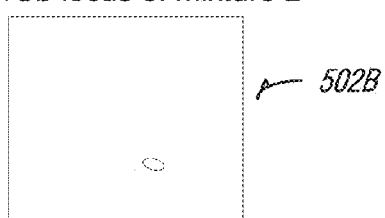
Figure 5D:
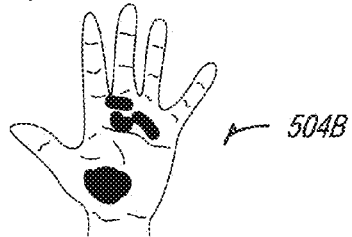
Figure 5E:
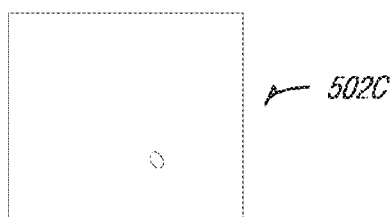
Figure 5F:
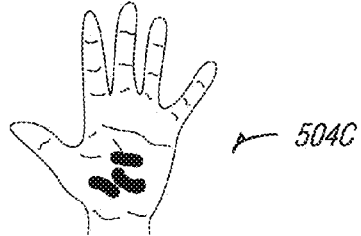
Figure 5G:
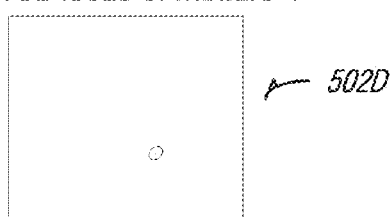
Figure 5H:
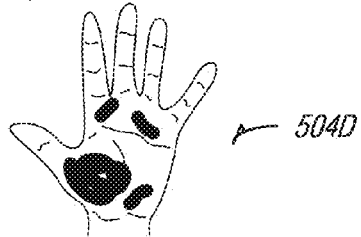
Figure 5I:
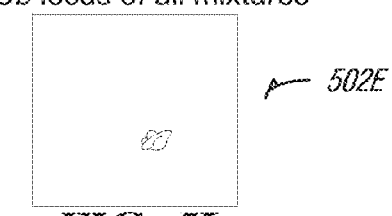
Figure 5J:
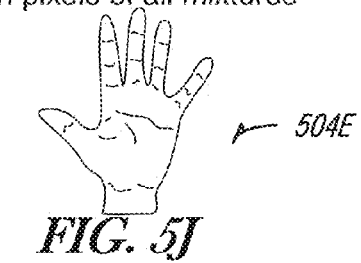

FIG. 4A illustrates generally a flowchart showing a technique 400 for skin filtering in accordance with some embodiments. Technique 400 may include determining or receiving an input frame 402 filtered on multiple layers, where each layer may use a different luminance-invariant color space. The technique 400 may include filtering using a color model $M_i$ in a color space $N_i$ 404 in a repetitive or iterative process for all i up to a specified number n including filtering using a color model $M_n$ in a color space $N_n$ 406. The technique 400 may include determining a skin mask 408. FIG. 4B illustrates generally color ellipse representations (e.g., 410 and 412) corresponding to operations in the technique of FIG. 4A in accordance with some embodiments. For example, the filtering using the color model $M_i$ in the color space $N_i$ 404 may correspond to color ellipse representations 410 and the filtering using the color model $M_n$ in the color space $N_n$ 406 may correspond to color ellipse representations 412. The color spaces used by the multi-layer architecture may be independent, such as using CrCb and HS. In an example, independent color spaces may include knowledge of a color representation in one space excluding knowledge of the representation of the same color in another space. In a layer, pixels are classified as skin pixels or non-skin pixels. In an example, for a pixel to be classified as skin, a pixel must be classified as skin by every layer of the filter. Conversely, a pixel may not be a skin pixel if it is not classified as skin in at least one of the layers of the architecture.

A color model may be associated with a probability density function such as the one given above in Eq. 1. In an example, skin may be detected by classifying as skin those colors for which their skin probability is higher than a threshold. Applying Eq. 1 on a pixel-by-pixel basis may be computationally expensive. Using information about the locus of skin colors may not be practical as the shape of typical skin loci is arbitrary. In an example, a Gaussian mixture model for skin may consist of a plurality of Gaussian mixtures.

In an example, a Gaussian mixture of a model may be associated with a separate ellipse region. In another example, the skin locus of a color model with the union of all ellipse regions coming from the Gaussian mixtures of the model may be approximated. Using ellipse regions for representing Gaussian mixtures is a natural choice, since the locus of all points that have probability higher than a threshold is the interior of an ellipse if probability density is characterized by a single Gaussian function. In addition, checking if a point is inside the interior of an ellipse may be computationally simple as it may include a small number of multiplication, addition and subtraction operations. Such operations are suitable for hardware acceleration. For example, using techniques, such as those described above, may improve functioning of a computer system running instructions that perform the techniques.

The use of ellipses, for example, may include using a color space dimensionality of two. If the color space dimensionality is higher than two, then ellipsoids or other higher dimensional analogues of ellipses may be used. In an example, the use of two dimensional color spaces may be used. In an example, the mean value vector of a mixture may include $\bar{\mu}_i=[\mu_x{:}\mu_y]$. In another example, the elements of the inverse covariance matrix $\frac{1}{2}\Sigma^{-1}$ of a mixture may include:

$$1/2 \cdot \Sigma^{-1} = \begin{bmatrix} \alpha_{00} & \alpha_{01} \\ \alpha_{01} & \alpha_{11} \end{bmatrix} \qquad \text{Eq. 9}$$

From these values, the major and minor radii $r_a$, $r_b$ and the rotation $\phi$ of an ellipse region associated with the mixture and probability threshold T may be determined, such as by using the operations of Eqs. 10-17 below. The probability threshold T in an example may be derived from the GMM coefficient associated with a mixture.

$$C \leftarrow -\ln(T) \qquad \text{Eq. 10}$$

$$\varphi_1 \leftarrow \arctan\left(\frac{a_{11} - a_{00} + \sqrt{(a_{11}-a_{00})^2 + 4a_{01}^2}}{2a_{01}}\right) \qquad \text{Eq. 11}$$

$$\varphi_2 \leftarrow \arctan\left(\frac{a_{11} - a_{00} - \sqrt{(a_{11}-a_{00})^2 + 4a_{01}^2}}{2a_{01}}\right) \qquad \text{Eq. 12}$$

$$r_{a1} \leftarrow \sqrt{\frac{2\sin(2\varphi_1) \cdot C}{(a_{00}+a_{11}) \cdot \sin(2\varphi_1) + 2a_{01}}} \qquad \text{Eq. 13}$$

$$r_{a2} \leftarrow \sqrt{\frac{2\sin(2\varphi_2) \cdot C}{(a_{00}+a_{11}) \cdot \sin(2\varphi_2) + 2a_{01}}} \qquad \text{Eq. 14}$$

$$r_{b1} \leftarrow \sqrt{\frac{2\sin(2\varphi_1) \cdot C}{(a_{00}+a_{11}) \cdot \sin(2\varphi_1) + 2a_{01}}} \qquad \text{Eq. 15}$$

$$r_{b2} \leftarrow \sqrt{\frac{2\sin(2\varphi_2) \cdot C}{(a_{00}+a_{11}) \cdot \sin(2\varphi_2) + 2a_{01}}} \qquad \text{Eq. 16}$$

if $r_{ba1} \geq r_{b1}$ then $\phi \leftarrow \varphi_1, r_a \leftarrow r_{a1}, r_b \leftarrow r_{b1}$ else $\phi \leftarrow \varphi_2, r_a \leftarrow r_{a2}, r_b \leftarrow r_{b2}$ \qquad Eq. 17

These computations may be performed as part of the periodic color model update process discussed above. The skin filtering process that is performed on a frame-by-frame basis may check if an input color vector $\tilde{x}_j=[x{:}y]$ is inside an ellipse region centered at $[\mu_x{:}\mu_y]$, associated with radii $r_a$, $r_b$ and rotation $\phi$, such as by using the operations of Eqs. 18-20 below:

$$e_x \leftarrow (x-\mu_x)\cdot\cos\phi + (y-\mu_y)\cdot\sin\phi \qquad \text{Eq. 18}$$

$$e_y \leftarrow -(x-\mu_x)\cdot\sin\phi + (y-\mu_y)\cdot\cos\phi \qquad \text{Eq. 19}$$

$$D \leftarrow r_a^2 \cdot e_y^2 + r_b^2 \cdot e_x^2 - r_a^2 \cdot r_b^2 \qquad \text{Eq. 20}$$

If $D \leq 0$ then $[x{:}y]$ is inside the ellipse, otherwise it is not. \qquad Eq. 21

FIGS. 5A-5J illustrate generally diagrams (e.g., 502A-502E and 504A-504E) showing skin color modeling in accordance with some embodiments. Using ellipse representations, a technique may classify a pixel as skin if the pixel color is inside at least one ellipse region in every layer of the architecture. Examples of filtering in the CrCb space using ellipse representations of Gaussian mixtures are shown in diagrams 502A-502E and 504A-504E. Diagrams 502A-502E include the skin loci associated mixtures of a GMM model. Diagrams 504A-504E show associated skin pixels of diagrams 502A-502E respectively. For example, diagrams 502A-502D show CrCb loci of mixture one through four and diagrams 504A-504D show skin pixels of mixture one through four. In an example, diagram 502E shows CrCb locus of all mixtures used and diagram 504E shows skin pixels of all mixtures. The union of the ellipse regions of all mixtures may result in accurate hand segmentation. For example, diagram 502E includes a combination of diagrams 502A-502D and diagram 504E includes a combination of diagrams 504A-504D. In another example, fewer than four or more than four CrCb loci mixtures or skin pixels of mixtures may be used. For example, five mixtures may result in more accurate hand segmentation than four mixtures but may take longer and three mixtures may result in less accurate hand segmentation than four mixtures but may be processed quicker.

In another example, to implement the multi-layer architecture, a lookup table may be used for the color representations of a layer. For example, for two dimensional spaces, the table size may be limited to 65536 entries. An entry may contain a single bit indicating if a corresponding color representation is skin. This technique is applicable to ellipse regions or arbitrary skin loci. A potential disadvantage of using lookup tables is that lookup tables may become hotspots when accessed by multiple processing units in parallel. In an example, a lookup table may be costlier to replicate in hardware than logic that checks if a point is inside an ellipse.

Figure 6:
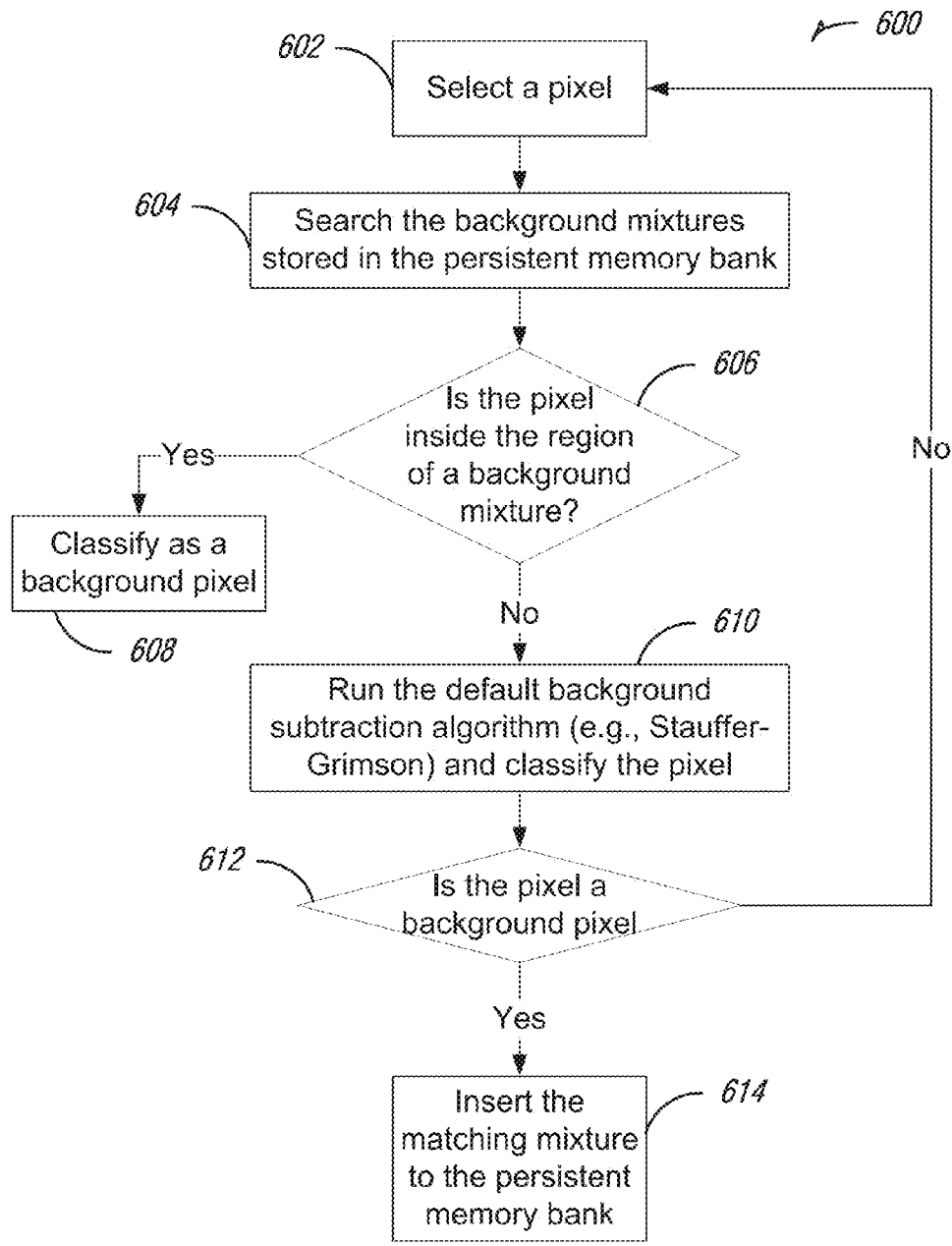
FIG. 6 illustrates generally flowchart showing a technique for background subtraction with persistent memory in accordance with some embodiments.

FIG. 6 illustrates generally flowchart showing a technique 600 for background subtraction with persistent memory in accordance with some embodiments. In an example, a pixel value may be selected 602 for a pixel position, and a search may be made on a persistent memory bank that stores background mixtures for a pixel position 604. In an example, each pixel position in an image includes a persistent memory. The technique 600 may include determining if the new pixel is inside the region of a background mixture 606. If the pixel is inside the region (e.g., yes), then the pixel may be classified as background pixel 608 and no further processing may be performed. If the pixel is not inside the region of a background mixture (e.g., no), then a default background subtraction technique may be run for the pixel position 610. Mixture actions may include removing a mixture or placing it in the persistent memory bank. The technique 600 may include determining if the pixel is a background pixel 612. If a pixel is classified as background (e.g., yes) its associated mixture may be inserted in the persistent memory bank 614. In another example, a simpler timer-based technique may be used. A timer-based technique may maintain two counters, a time-since-active and time-since-inactive counter for a mixture. A timer-based technique may decide on the state of the pixel as well as mixture actions based on threshold values specified for the two counters. In an example, if a mixture is active for a specified period of time (e.g., a time-since-active timer exceeds a first threshold $T_1$), then the mixture is considered background. In another example, if the time-since-active timer exceeds a second threshold $T_2$ (e.g., $T_2 > T_1$), then the mixture may be placed in the persistent memory bank. In yet another example, if a time-since-inactive timer exceeds a third threshold $T_3$ (e.g., $T_3 < T_1$), then then the time-since-active timer may be reset to zero.

In an example, a background subtraction system may remove overlapping pixels that remain in the background after the multi-layer skin filter performs its processing. In an example, standard background subtraction techniques may be augmented with a persistent memory mechanism to better handle temporarily occluded background areas.

Background subtraction techniques model the color representation of a pixel in the image using a Gaussian Mixture Model in the three dimensional RGB space. The main idea behind these techniques is that the static background may be distinguished from the foreground at a certain pixel position if the color values that appear in the pixel position across several frames are inside a limited range. The variance in static background values observed at a pixel position is limited because of the presence of camera noise. Foreground may be distinguished from background taking into account the usual presence of motion in the foreground. A pixel is classified as foreground if the number of times a pixel color appears inside a mixture is small or lower than a threshold. This is an indication that the objects which may be present in the pixel position have not been immobile long enough, so as to associate the pixel position with static background. In an example, the camera may be static in background subtraction.

In an example, background subtraction may be flexible and react quickly to camera and light changes. Background subtraction may include forgetting past foreground areas or pixels quickly to not corrupt defining moving objects. Each pixel in an image may be modeled separately using a background subtraction technique. The background subtraction technique may include two types of mixtures, such as active mixtures and persistent background mixtures stored in a persistent memory. The background subtraction technique may include updating matching mixtures using a GMM model and separately determine which pixel colors are included in a static background and which pixels are in a foreground mask. The background subtraction technique may include using timers with absolute values instead of weights. The background subtraction technique may include classifying a pixel as background and storing the classification information in a persistent memory. The pixel may then be considered background for a period of time without re-running the background subtraction technique for that pixel. The timers may measure time since an active measurement and time since an inactive measurement, as described above. The background subtraction technique may first search the persistent memory before running additional classification operations. When a pixel is in the persistent memory, that may stop the process for that pixel. If the pixel is not in the persistent memory, the pixel may be classified according to the background subtraction technique described above.

A technique may include determining if a pixel is in a persistent memory bank. If the pixel is in the persistent memory bank, it is a background pixel and may be classified (or remain classified) as a background pixel. If the pixel is not in the persistent memory, a timer-based process may be run to determine if the pixel is a background pixel. If it is not, the pixel should not be classified as a background pixel. If it is, then the pixel should be placed in the persistent memory.

Figure 7:
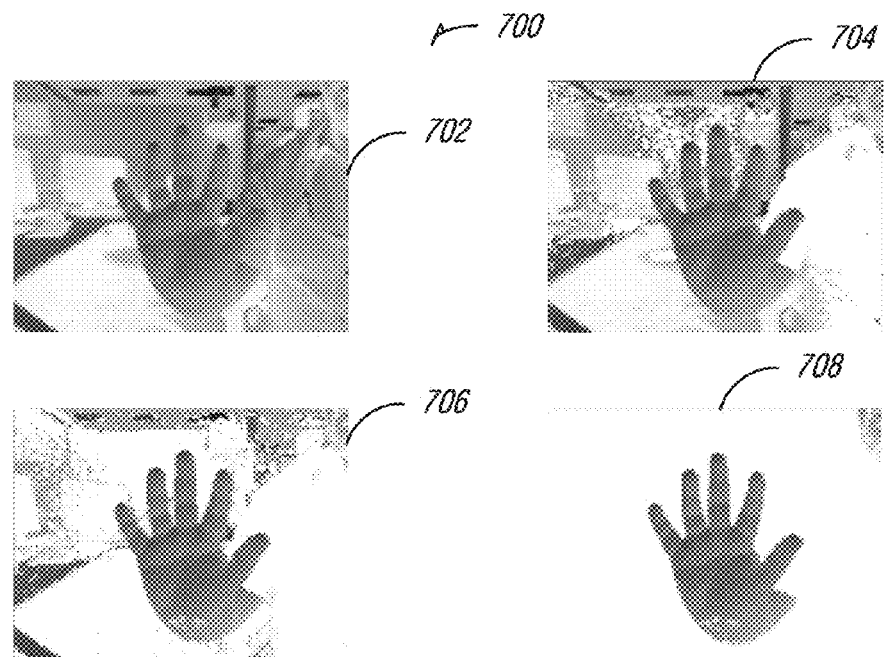
FIG. 7 illustrates generally a diagram showing progressive examples of skin detection in accordance with some embodiments.

FIG. 7 illustrates generally a diagram 700 showing progressive examples (e.g., 702, 704, 706, and 708) of skin detection in accordance with some embodiments. In an example, two color models are computed in the CrCb and HS spaces using as seed values the internal pixels of fingertip contour lines identified using a template matching process. As shown in diagram 700, the multi-layer skin filter first removes background pixels in the CrCb space (e.g., from example 702 to example 704). Due to color collisions, a number of background pixels may remain. A second filtering in the HS space (e.g., as shown in example 706) further removes background pixels leaving, for example, a few opaque areas in such as the desk surface and part of the ceiling. In an example, these areas are completely removed by the background subtraction system leaving the palm region and part of the face of the user (as shown in example 708). What is important in this example is that the non-skin part of the foreground which is the shirt of the user is removed by the multi-layer skin filter first. Since the shirt is part of a possibly moving foreground it would be difficult to remove by the background subtraction stage later. All other non-skin pixels may be removed either by the multi-layer skin filter or the background subtraction stage.

Figure 8:
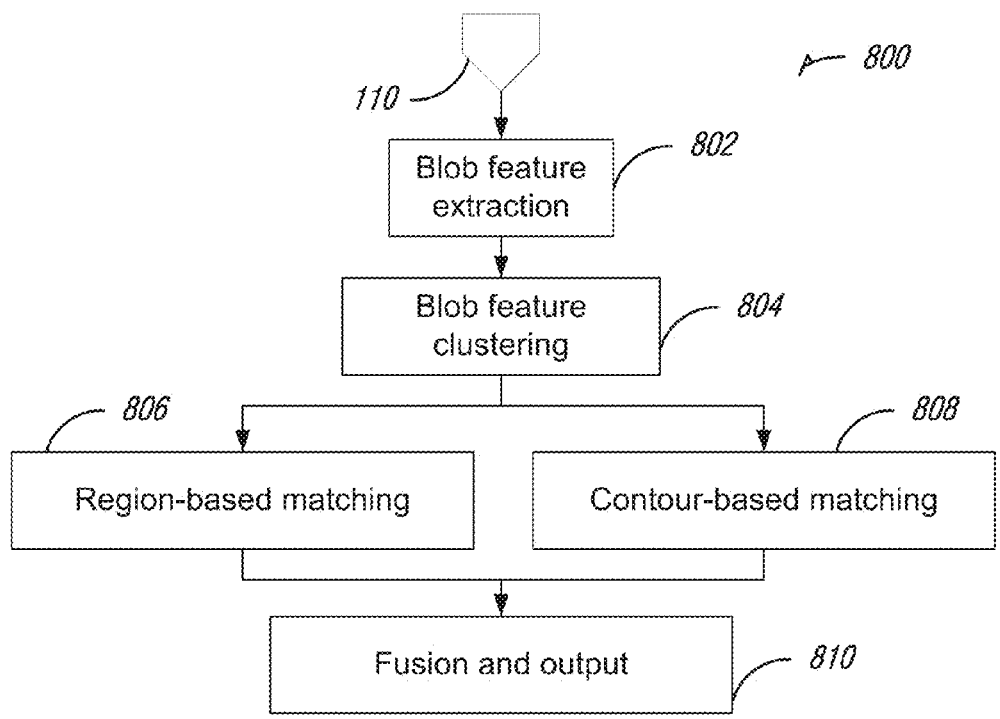
FIG. 8 illustrates generally flowchart showing a technique for pose matching in accordance with some embodiments.

FIG. 8 illustrates generally flowchart showing a technique 800 for pose matching in accordance with some embodiments. The pose matching technique 800 determines if any cluster of features coming from skin areas represents a meaningful hand pose. The pose matching technique 800 may include blob feature extracting 802 and blob feature clustering 804. Feature clusters may be fed into two components running in parallel. These two components perform different pose matching functions. The technique 800 may include region-base matching 806, which creates bit grid or blob grid pose descriptors from clusters and compares these descriptors against a multiplicity of pose descriptors stored in a library. Comparisons may be performed using a K-Nearest Neighbor (KNN) technique. The technique 800 may include contour-based matching 808, which creates Fast Fourier Transform (FFT) descriptors of skin area contours of input clusters and classifies these descriptors as associated with hand poses using a trained Support Vector Machine (SVM). The results of these two matching techniques 806 and 808 may be fused and the technique may include outputting detected hand poses 810. The technique 800 may be operation 110 as a continuation of the technique 100 in FIG. 1 as described above.

In an example, a feature extraction process analyses the mask produced by a skin detector and detects points of interest. A mask may be a skin mask containing grayscale or color values for skin pixels and zero for non-skin or a binary mask with elements equal to one for skin pixels and zero for non-skin.

Blob features may include visual structures that resemble a Gaussian kernel in different locations and sizes on the hand pose. To extract these features, a convolution operation may be performed between the input mask and the trace of the Hessian matrix defined for various scale values. Computationally equivalent detectors other than the Hessian trace may also be used. Using blob features instead of pixels for descriptor generation and pose matching is preferable. Blob features may be fewer in number than pixels and hence may be processed more quickly. Second, blob features may be used for reconstructing the hand silhouette more reliably as compared to pixels, compensating for skin holes or missing pixels in the pose. Third, blob features may be used for identifying and pruning weak clusters resulting mostly from background collisions with skin.

Figure 9:
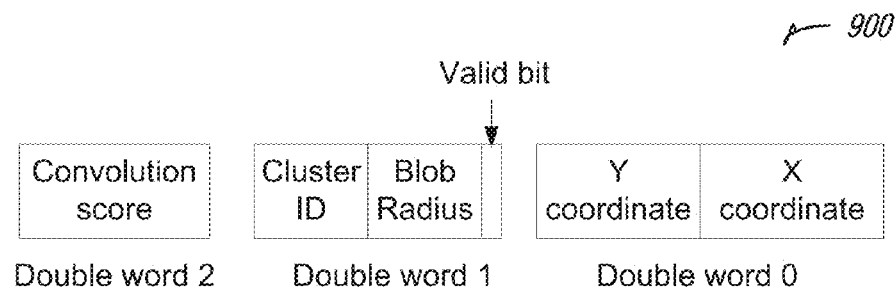
FIG. 9 illustrates generally a diagram showing a blob feature state representation in accordance with some embodiments.

FIG. 9 illustrates generally a diagram 900 showing a blob feature state representation in accordance with some embodiments. In an example, a blob feature is characterized by a pair of centroid coordinates (x, y), a radius value r and a convolution score s. The radius value r is the standard deviation of a Gaussian kernel associated with a blob at (x, y). The convolution score s is a metric that reflects how close a detected blob is to the shape of a Gaussian kernel. Once clustering is performed, a blob feature is associated with a cluster ID.

The valid bit may indicate that a blob feature is further used in the process of generating hand pose descriptors. If the bit is invalid, the blob may be discarded. The valid bit may track whether the blob is still valid and may be included in further processing. A multiplicity of post processing operations may mark the blob as invalid as discussed below. The bit may continue to be used to ascertain the validity or invalidity of the blob.

In an example, blob feature coordinates result from periodically subsampling the input skin mask at fixed intervals. In an example, intervals are equal to 4 pixels. In another example, alternative methods such as nonmaxima suppression may be used. Following the selection of feature coordinates, scale space search may take place by performing convolutions at the selected locations. At the end of the feature extraction process blob features are sorted according to their convolution score and blob features with convolution score lower than a threshold are pruned from the resulting feature list.

The definition of blob features is generic and encompasses the definitions of other features. If the radius information and convolution score are left unspecified the resulting blob features are just points, and may be referred to as point features. Point features are used in some parts of the pose matching system instead of blob features as explained below. The derivation of point features may be realized in many ways, for example either by subsampling a skin mask at fixed intervals or by ignoring the radius and convolution score information of already derived blob features. In the latter case point features are a degenerate type of blob features. If the sub-sampling interval is further reduced to zero, point features are reduced to pixels. Image pixels, or point features, in this respect, may be seen conceptually as a degenerate type of blob features as well.

Figure 10:
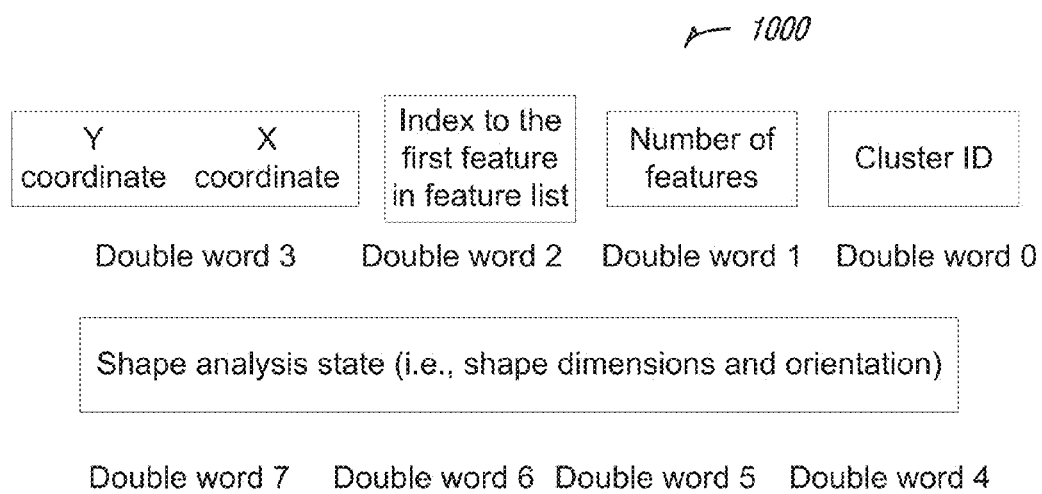
FIG. 10 illustrates generally a diagram showing a feature cluster state representation in accordance with some embodiments.

FIG. 10 illustrates generally a diagram 1000 showing a feature cluster state representation in accordance with some embodiments. In an example, after feature extraction is complete, blob features are grouped into clusters. Clustering may be beneficial because the mask returned by the skin detector may contain more than one opaque skin area. For example, there may be multiple faces or hands in an image. The state of a cluster may include a cluster identification (ID) value, information about the x and y coordinates of a cluster center, information about the features included in a cluster or information about a cluster shape. Cluster shape information further includes the lengths of a shape's major and minor axes (e.g., width, height) and the shape's orientation. A cluster ID is a value that distinguishes a cluster from others. A cluster center may be computed as the centroid of the set of features in the cluster or as the centroid of a connected component associated with the cluster in case morphological clustering is used. The set of features may be described in terms of their number and starting feature in a sorted list returned by the clustering technique. In such state description, features of the same cluster may be adjacent to each other in a list returned once clustering is complete. Principal component analysis (PCA), image moments or similar techniques may determine the rotation of the cluster and the size of its shape (i.e., width, height). If PCA is used these values are computed by a pair of returned eigenvectors and eigenvalues. Finally, a heuristic technique may be used in a cluster post processing stage discussed below to help with better estimating the width and height of a cluster.

In an example, after clustering is done, a cluster is used for constructing a pose descriptor which is classified as a valid static gesture by a pose matching system. Various clustering techniques may be applied. These techniques may correctly determine the number of clusters k and the starting cluster centers at the expense of some reasonable computation overhead. In an example, a technique is based on using morphology operations and connected component labeling, which may be referred to as 'morphological clustering'. Another example is based on a variant of the hierarchical clustering technique.

Figure 11:
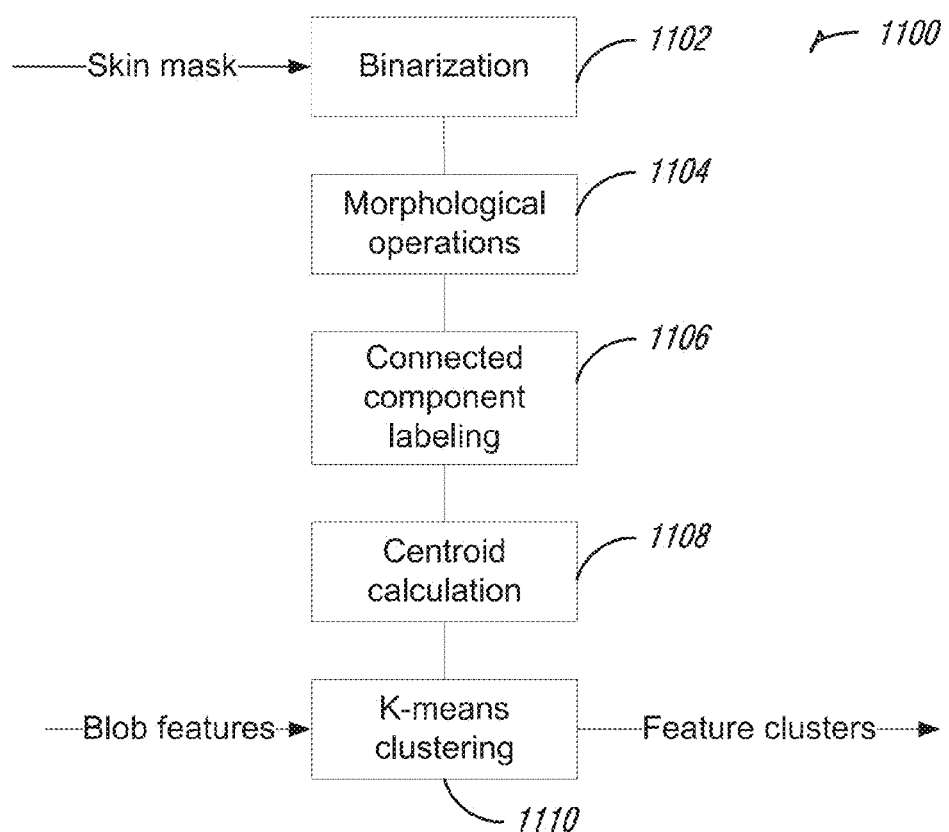
FIGS. 11-12 illustrate generally flowcharts showing techniques for feature clustering in accordance with some embodiments.
Figure 12:
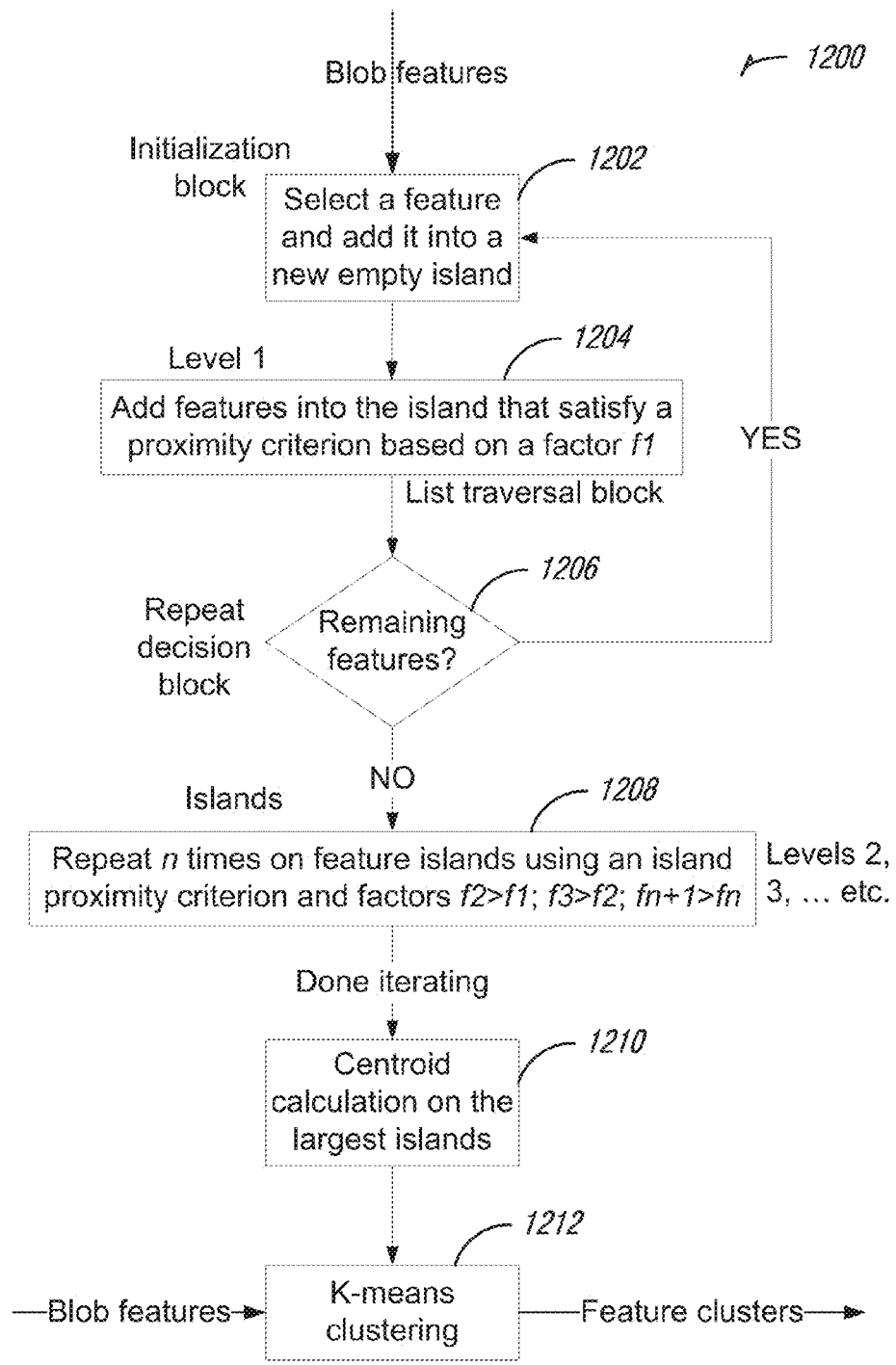

FIGS. 11-12 illustrate generally flowcharts showing techniques (e.g., 1100 and 1200) for feature clustering in accordance with some embodiments.

In an example, a technique 1100 may include using as input the skin mask returned by the skin detector, applying a threshold process to obtain a related binary image (e.g., Binarization 1102). The technique 1100 may include a series of morphological operations 1104 to remove noise and to close small gaps which may be present in the connected components of the mask. In an example, morphological operations 1104 may include a first dilation operation followed by a second opening operation, followed by a third closing operation. The kernels used by the morphological operations 1104 may be square kernels of various sizes. For example in an example, square kernels of sizes 10×10, 3×3 and 5×5 may be used for the dilation, opening and closing operations respectively. Following the morphological operations 1104, the technique 1100 may include connected component labeling 1106 to detect the connected components that are present in the image. For a connected component a centroid is calculated using image moments. The number of resulting connected components is the number of clusters k used by a k-means operation 1110 that follows. In an example, centroids from the connected components computed (at operation 1108) in this stage are used as initial cluster centers by a k-means clustering operation 1110. The connected component labeling 1106 may result in a clustering scheme that is robust, so that one iteration of k-means may be used without repetition. The technique 1100 may output feature clusters.

In an example, a technique 1200 may include a variant of hierarchical clustering, which may be referred to as greedy hierarchical clustering, where features are iteratively merged and clusters grow. In an example, the technique 1200 may include merging operations that take place on a single feature group at a time. The technique 1200 may result in faster implementations. The technique 1200 may be repeated through a number of hierarchical clustering levels, where in each level merging operations create temporary groups of features, called 'islands'. Merging operations at the first level take place one island at a time between a single island and input features. Merging operations at other levels take place between the islands which are formed at the level before. A level is associated with a factor value. The factor value is used by a proximity criterion to determine if two features or islands are close enough so as to be merged to the same group. The factor of a level is greater than the factor for the level before. For example, three levels may be used with factor values equal to 0.5, 1.0 and 1.5 respectively.

In an example, technique 1200 may include selecting a feature and adding it into a new empty island 1202. For example, island initialization may include initializing an island to become the focus of subsequent merging operations. In an example, this island may be referred to as an island of focus. The technique 1200 may include selecting a feature into the island that satisfies a proximity criterion 1204. For example, the feature may be a feature with the largest blob radius. The technique 1200 may include determining if there are remaining features that may be added to the island 1206, and if so, repeating operation 1202. If not, then the technique 1200 may be iterated using a new feature to create a new island. For example, a feature is selected from among features not taken into account yet and used in subsequent merging operations. The island selected may be the one with the largest number of features. The technique 1200 may include calculating a centroid on the largest islands 1210 and k-means clustering 1212.

In an example, selecting features in operation 1204 includes examining a list of features or islands and performing merging operations between elements of the list and an island of focus. In an example, features or islands are linearly traversed. In another example, the list may be sorted according to some criterion such as the blob radius, island size, or the convolution score of features. Sorting may take place before the repeat decision block. As features or islands are traversed, merging decisions are made concerning an island of focus and the elements of the list which are visited. To make merging decisions, the technique applies a feature proximity criterion based on a cluster growth distance metric. The cluster growth distance metric uses blob radius information to determine if two features are close enough so as to be merged to the same island. In an example, two features centered at pixel coordinates $(x_1,y_1)$ and $(x_2,y_2)$ may be used and the blob radii of the features may be $r_1$ and $r_2$. The features may be considered close according to the cluster growth distance metric if the following inequality holds:

$$D(x_1,y_1,x_2,y_2) < (r_1+r_2) \cdot f \qquad \text{Eq. 22}$$

Where $D(x_1,y_1, x_2,y_2)$ is the distance between $(x_1, y_1)$ and $(x_2,y_2)$, and f is the factor value at the level where merging is performed. Distance $D(x_1,y_1, x_2,y_2)$ may be computed as a Euclidian, Manhattan or Mahalanobis distance between $(x_1, y_1)$ and $(x_2,y_2)$. Using the cluster growth distance metric, a cluster is progressively defined as a group of blob features which grows as islands are merged together. Merging between an island and a feature is performed if there is at least one feature in an island that satisfies Eq. 22 with an input feature. Merging between two islands is performed if there is at least one pair of features, one from an island that satisfies Eq. 22.

In an example, the technique 1200 includes determining if there are any features or islands that have not been taken into account in the execution of the first and second block (e.g., operation 1206). If there are no such features or islands, or if no merging decisions are made in the last feature selection, the technique 1200 may determine that a level is complete. In another example, the technique 1200 may continue at with a new island of focus.

A level is complete when no features in any pair of islands satisfy the proximity criterion of Eq. 22. After a level is complete the technique proceeds to a next level. The input to a next level is the islands coming from the previous level. Technique 1200 may be repeated for a next level with a different factor value. If no merging operations are performed at a level, no subsequent levels are executed. At the end of the process the largest islands are selected and their centroids calculated using image moments. The selection may be based on a size threshold.

The factor value controls the quality of the merging operations between clusters and a minimum proximity to result in meaningful visual entities. A factor value may be used to find well-defined clusters that are separated from each other but also contain features that are close. The factor value is a means to control the distance between clusters and also to ensure that the closest clusters are always merged together first. The iterative process helps prevent clusters that are disjoint but should have been merged to result in more meaningful visual entities.

The centroids computed 1210 from the hierarchical clustering process may be used as initial cluster centers in a single iteration k-means operation 1212. This operation 1212 may associate an input feature with a closest centroid. The number of levels, factor values and size thresholds in an example may be derived using training over hundreds of images. Such parameters may further be tuned depending on performance requirements and operating conditions. When compared to morphological clustering, hierarchical clustering may operate on features as opposed to image pixels. Hierarchical clustering may be faster or slower than morphological clustering depending on the processor architecture or accelerator used. Morphological clustering uses operations which are more single instruction, multiple data (SIMD) friendly (e.g., opening, closing dilations) as compared to the blocks of the hierarchical clustering technique. In another example, hierarchical clustering operates on a smaller number of elements. Using both morphological and hierarchical clustering allows the most suitable technique to be activated in different hardware systems.

In an example, after clusters are determined a number of post processing operations are performed. Post processing operations include shape analysis, cluster filtering, hand-forearm segmentation, and boundary analysis. Shape analysis may be done for by determining the orientation and the length of a shape's major and minor axes. This analysis may be done using PCA, image moments or other techniques. If PCA is used, the shape of a cluster is approximated with an ellipse. PCA in this case returns the direction and sizes of the major and minor axes of the ellipse. These values are represented by a pair of eigenvectors and eigenvalues. The eigenvectors associated with the major and minor axes of an ellipse are the principal components of a cluster shape. Shape analysis results in the computation of a cluster shape's dimensions and orientation. This information is stored as part of the state of a cluster as shown in FIG. 10.

Next, clusters may be filtered by their area and number of features. Filtering operations are applied to eliminate any clusters that have a low probability of returning a valid hand pose. Cluster area may be estimated from the number of features and blob radii values or calculated using image moments. Thresholds are empirically determined for a filtering operation. The threshold used in area filtering operations depends on the resolution of the input image, the field of view and the operating distance from the camera. The number of features used for a cluster to be valid may be determined through experimentations. This number is based on the fact that there are a minimum scale-invariant number of features which may be used to properly construct a descriptor from a cluster (e.g., bit grid, blob grid or Fourier descriptor, as discussed below). In an example, an area threshold of 5000 pixels and a feature number threshold of 300 features computed from video frames in VGA resolution may be used. The filtering operations may be performed together as part of a cluster post processing stage or may be interleaved with other stages of the clustering techniques. For example, area-based filtering may be performed after the completion of the connected component labeling process which is part of morphological clustering. In the same implementation, filtering based on the number of features may be performed after the computation of clusters and before shape analysis.

The cluster dimensions returned by shape analysis may be used in a hand-forearm segmentation process which detects where a hand wrist may be. In an example, to reduce the variability in pose representations, elements in the library for pose matching may include containing no forearm component or a small percentage of the forearm. For example, detecting the wrist and eliminating features which may not be part of the hand increases the chances of correct pose matching.

Boundary analysis on the features of clusters may be applied and any features that fall outside boundaries determined by the axes of the cluster shape may be eliminated. It is useful to remove these outliers as they may corrupt the generation of pose descriptors. In an example, boundary analysis may sort features based on their distance from a centroid. Alternatively, features may be sorted based on their distances from the major or minor axes of a cluster shape. Boundary analysis traverses a sorted list of features until it encounters a distance jump which is greater than a threshold. Features having distance increments which are greater than a threshold are pruned as outliers. Furthermore, features which are further away from outlier features are considered outliers also. This process updates the estimates of cluster dimensions returned by shape analysis earlier. It may also precede hand-forearm segmentation. Clusters centers may also be tracked across frames using a prediction filter like a Kalman filter. A Kalman filter may be used for better estimating the position of cluster centroids across frames avoiding any jitter due to noise. The clustering process may create regions of interest in an image which are passed to a pose matching stage to be classified as potential hand poses.

FIG. 13 illustrates generally a system 1300 for bit grid 1304 and hash stream 1306 generation for region-based matching in accordance with some embodiments. Bit grid 1304 descriptors may be constructed from point features 1302. To construct a bit grid 1304, a square region in an input image may be placed around the center of a computed cluster. This region is mapped to a square bit grid of size n×n. In an example, point features associated with a cluster are mapped to elements of the bit grid 1304. The dimensions of the square in the input image are equal to the maximum between a cluster's width and height. The square region in the input image may also be rotated. The cluster post processing stage described above determines the orientation and dimensions of a cluster shape and these are used to linearly map the coordinates of point features into the bit grid 1304. Cluster rotation may be taken into account by the linear mapping stage using the cluster shape properties. If multiple features fall in the same position in the bit grid, then the value in that position is still 1.

Mapping may include using $(x_c, y_c)$ as the coordinates of the center of a cluster and $(x,y)$ as the coordinates of a point feature in the cluster, D as the size of the bit grid, w as the width of the cluster, and h as the height of the cluster. Point feature $(x,y)$ may be mapped to an element $(x_s, y_s)$ in the bit grid 1304 using Eq. 23 below. In Eq. 23 the column and rows indexes $(x_s, y_s)$ of the element are computed, for example, if the cluster shape is not rotated.

$$x_s \leftarrow D \cdot \left(\frac{1}{2} + \frac{x - x_c}{\max(w, h)}\right), y_s \leftarrow D \cdot \left(\frac{1}{2} + \frac{y - y_c}{\max(w, h)}\right) \quad \text{Eq. 23}$$

If the cluster shape is rotated, a modified mapping process may be followed that involves a rotation value $\theta$ returned by shape analysis:

$$x_r \leftarrow (x - x_c) \cdot \cos\theta + (y - y_c) \cdot \sin\theta, \quad \text{Eq. 24}$$
$$y_r \leftarrow -(x - x_c) \cdot \sin\theta + (y - y_c) \cdot \cos\theta,$$
$$x_s \leftarrow D \cdot \left(\frac{1}{2} + \frac{x_r}{\max(w, h)}\right), y_s \leftarrow D \cdot \left(\frac{1}{2} + \frac{y_r}{\max(w, h)}\right)$$

The locations in the bit grid that correspond to point features are marked by taking the value 1. All others take the value 0. In an example, an additional operation may be applied where in addition to marking mapped locations with values equal to 1, a dilation operation using a kernel of some fixed size m×m may be applied. In an example, a specified value for m may include 3. The dilation operation may help with better defining the hand silhouette from point features as all elements in m×m rectangular areas around mapped pixels are marked as 1. The dilation operation may help in this respect with filling any holes which may be present in a hand pose due to lack of detected features. In an example, optional operations may follow, such as additional morphological operations and filtering of connected components. For example, a closing operation may be employed using a 3×3 square kernel and a filtering operation where the largest connected component in the bit grid is used.

The detection of the dimensions and orientation of a cluster shape and the linear mapping of point features may help with retaining the aspect ratio of a hand pose. Some changes to the aspect ratio may also be applied to the major axis size to allow for a pose to fit nicely into a bit grid. In an example, such changes may be done to the pose library used by KNN technique for consistency.

Various bit grid sizes (e.g., 16, 32, 128, or 256) may be used. The detection performance improves when a larger bit grid is used. In an example, to capture the structure of a pose such as the space between the fingers in an open palm pose, a grid may be large. If a small grid is used these structural properties may become lost. The process of mapping a hand pose to a fixed size bit grid makes the process translation and scale invariant. Moreover, if rotation of a cluster shape has been detected, then the bit grid may be created so that the major axis of the hand pose is aligned with the vertical dimension of the grid, as supported by Eq. 24.

In an example, after bit grids 1304 are computed, they may be converted into hash streams 1306. Hash streams 1306 may be determined by applying a compression function on the bit grids 1304. Compressing bit grids 1304 may help with tuning the performance of a bit grid-based pose matching system to the memory and compute requirement of some hardware architecture. To do the compression, a bit grid 1304 may be considered as consisting of sub-blocks, for example, of size 1×1. In another example, if 2×2 sub-blocks are used in a 128×128 grid, the system may include 4096 sub-blocks. To compute a compressed hash stream 1306, a sub-block is mapped to single bit in the hash stream 1306. This bit may be computed as the logical OR of all elements in the bit grid which fall into the sub-block. In another example, computations may be done using different functions.

The use of smaller grids may result in loss of structural elements of a pose which are important for classification. In another example, bit grid 1304 post processing operations, such as morphology operations are better applied on larger grids than smaller grids. Morphology operations on lower resolution bit grids may result in coarser looking hand pose silhouettes. For example, a 3×3 dilation in a lower resolution bit grid may map to a 6×6 dilation in higher resolution bit grid. This may result in noticeable loss in the quality of a descriptor impacting pose matching accuracy.

In the on-line phase, pose descriptors represented as bit grids 1304 or hash streams 1306 may be compared to a library of pre-computed and labelled descriptors. The pose library is computed off-line by running the same process, storing the resulting descriptors and labeling them as associated with hand poses. The size of the library may impact the detection accuracy. The more variants of a pose are in a library the better the detection rate is. The matching process uses the Hamming distance metric. Bit grids 1304 are efficient, compact and have low latency, and their memory footprint is small, as the storage used is for hash streams 1306. This allows for larger libraries leading to better generalization.

FIGS. 14A-14D illustrate generally diagrams (e.g., 1400A-1400D) showing blob grid generation for region-based matching in accordance with some embodiments. An alternative approach to bit grids is to use blob grids. Bit grids may suffer from noise in the skin image which may be present in the form of outlier features and blob grids may suffer less. This is due to blob grids being constructed from circular entities that carry more structural information of a pose. In bit grids, the effect of noise may be the same as the effect of having an input pose which is different from what is stored in a descriptor. In bit grids, if a bit in a hash stream has a mismatch with a bit in a library descriptor this mismatch may impact a computed distance value the same way irrespective of the location of the mismatch. Blob grids are designed to address this issue. Blob grids may add robustness as they capture additional structural information of a pose and may compensate for feature location jitter especially in challenging environments.

In an example, blob grids result by overlaying circular grids on byte grids. Circular grids correspond to detected blob features. The mapping is done in a cumulative way. The generation of blob grid descriptors makes full use of the radius parameter of blob features. Blob features map to filled circles of radii resulting from a linear map between a blob radius value and a number of elements in a byte grid of fixed size. These filled circles when superimposed on each another form a potential hand silhouette. Since circles are filed, any skin gaps in the original mask are filled as well and no further morphological operations are used. Constructing and comparing blob grids may use more computations or a larger memory footprint to store and access blob grid libraries. For example, an element in a blob grid may use one or more bytes of storage as opposed to a single bit. Examples of generated blob grids are shown in diagrams 1400A-1400D in FIGS. 14A-14D.

The computation of blob grids may be made rotation and scale invariant taking into account the dimensions and orientation of cluster shapes, just as the computation of bit grids is. In an example, blob grid elements may be within a range of 0 to 255. In another example, blob grid elements may take a value of 0 or 1. In yet another example, a final grid may result from the logical OR between the circular grids of a cluster's blob features. Once a blob grid is constructed, its elements may be scaled to the range [0,255]. A blob grid is then classified by comparing it to a pre-computed library of blob grids using the Hamming, Euclidian or Manhattan distance metrics.

In an example, to add robustness to region-based matching, a K-Nearest Neighbor (KNN) technique is used. A pose library typically contains descriptors of many variants of a hand pose. If an input descriptor is generated from a valid static gesture, the pose matching stage may return a descriptor or several of the same pose in a list of best matching results. Using a KNN technique allows searching of the K best matching results from a list of descriptors and to make a decision about a detected gesture based on the values of these K results. In an example, a valid static gesture is detected if more than half of the K best matches are of the same hand pose. In another example, a valid static gesture is detected if more than two thirds of the K best matches are of the same hand pose.

FIG. 15 illustrates generally a diagram of a technique 1500 for contour-based matching in accordance with some embodiments. Another technique for detecting and classifying objects is contour-based matching. To extract the coordinates of the contours of an object from features, technique 1500 may be used. Point features 1502 are first mapped into an n×n bit grid using a process similar to the one described above for region-based matching. In an example, technique 1500 may include all operations of technique 1300 except for the hash stream compression stage. In technique 1500, morphological operations and non-linear operations such as median filters may be applied for eliminating noise. A connected component labeling technique may also be used to identify different components, sort them by area and retain the biggest ones. The binary n×n grid may also be filtered to retain its biggest object 1504. A boundary tracing operation 1506 is then applied to extract a one dimensional array of (x,y) coordinates which represent the contour of an object. The one dimensional array of (x,y) coordinates is then sub-sampled to a specific length (e.g. 256 points).

The Fourier descriptors of the contour may be extracted 1508. There are various methods for extracting Fourier descriptors. In an example, a one dimensional Fourier transform may be applied to an array of (x,y) coordinates by considering a coordinate pair as a complex number of the form x+j·y, where j is the imaginary unit. Applying a Fourier transform to this sequence of complex numbers generates another sequence of complex numbers. In an example, the input sequence to the Fourier transform may include referring to In as the input sequence and On as the output sequence. In an example, technique 1500 may include truncating coefficients 1510, as described below.

Figure 16A:
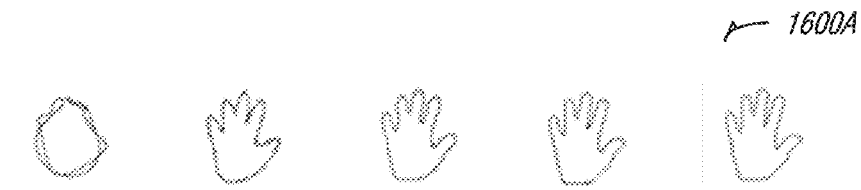
FIGS. 16A-16B illustrates generally diagrams showing results of operations for contour-based matching in accordance with some embodiments.
Figure 16B:
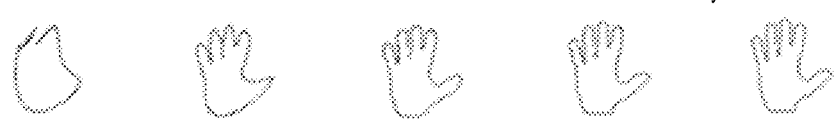

Taking the inverse Fourier transform of On, the input sequence In may be regenerated without a loss of information. In another example, if the first N coefficients in On are retained and the rest are set to zero, then the process of taking the inverse transform of that sequence may result in an approximation of the original shape. These approximations are shown in FIGS. 16A-16B. FIGS. 16A-16B illustrates generally diagrams (1600A and 1600B) showing results of operations for contour-based matching in accordance with some embodiments. FIGS. 16A-16B illustrate examples where the number of retained coefficients takes the values 4, 8, 16 and 32. As shown in FIGS. 16A-16B, retaining 8 coefficients may capture the contour of an object efficiently. The coefficients which remain after some pruning is done constitute the feature vector which is further used in the process. An advantage of Fourier descriptors is that they allow capture of a large amount of pose variations by using descriptors of small size.

Next, applying the laws of linear transformations, descriptors may be obtained that are invariant to translation, scaling and the starting point of boundary tracing. Invariance to translation is achieved by excluding the DC coefficient (coefficient 0) in resulting descriptors. Invariance to scaling is obtained by dividing all coefficients by the DC coefficient. Invariance to the starting point of the boundary tracing technique may be obtained by using the magnitude of the coefficients in a Fourier Descriptor.

In an example, to classify a feature vector as associated with a pose, trained Support Vector Machines (SVMs) may be used. SVMs are machine learning binary classifiers which are able to achieve good classification and generalization results by calculating a linear class separator with maximum margin. In SVMs non-linear data is mapped to a linear space using a kernel projection step, which takes place before classification. The parameters of the kernel are discovered through experimentation as part of an optimization step. Since an SVM is a binary classifier, it may be used as a component of a multi-class classification system that is based on one-on-one voting steps. An aggregating voting scheme is used to define a winning class. This is a standard methodology for realizing multi-class classification from binary classifiers. For example, for a database of 7 different poses, 1+2+ . . . +6=21 different one-on-one SVM classifiers may be used. SVM classifiers may run sequentially or in parallel and the results of a classifier are used, for example, to vote for a winning class. The class with the largest number of votes is then determined as the winning final class.

Figure 17:
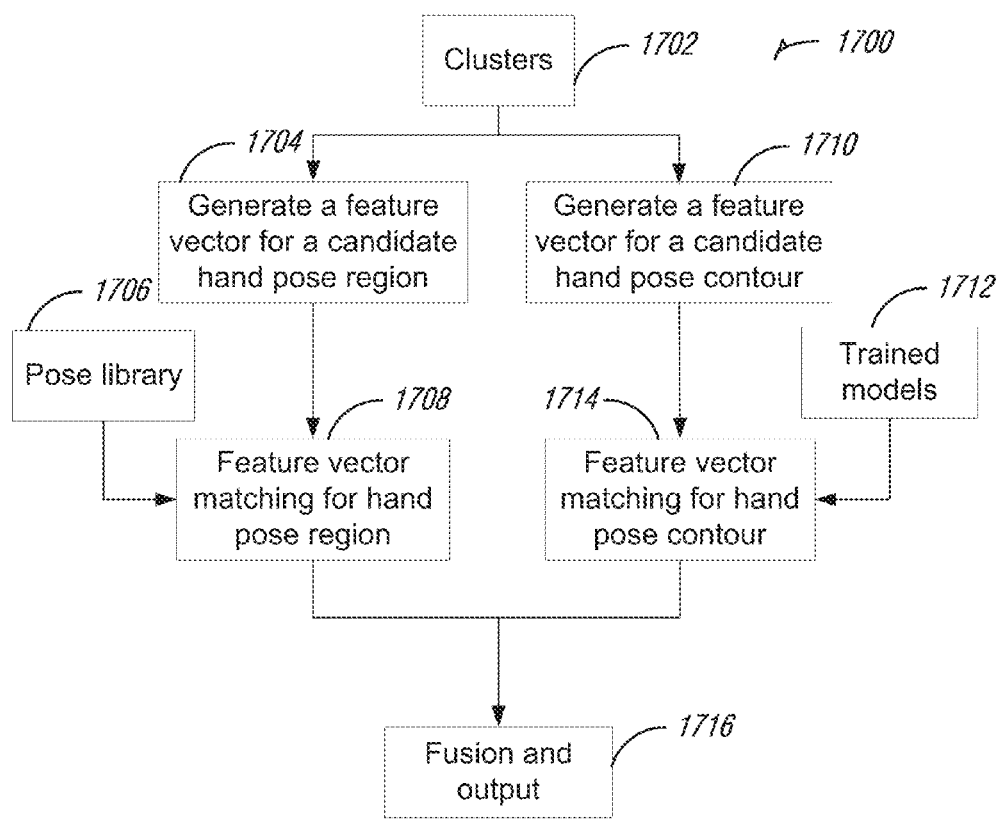
FIG. 17 illustrates generally flowchart showing a technique for fused pose matching in accordance with some embodiments.

FIG. 17 illustrates generally flowchart showing a technique 1700 for fused pose matching in accordance with some embodiments. Region and contour-based matching may be important to correctly classify a hand pose. In an example, to take advantage of the characteristics of both techniques, a simple fusion stage may be employed where the results of both techniques are combined using a voting scheme. For example, the technique 1700 may receive the clusters 1702 and generate a feature vector for a candidate hand pose region 1704 and a candidate hand pose contour 1710. The technique 1700 may receive poses from a pose library 1706 and match those poses to the feature vector for the candidate hand pose region 1708. The technique 1700 may receive trained models 1712 and match the models to the feature vector for the candidate hand pose contour 1714. The technique 1700 may fuse and output a candidate hand pose region match and a candidate hand pose contour match 1716. In an example, to reduce false positive rates a simple rule may be applied. For example, if the region and contour results match, the static gesture is valid. A static gesture is detected, for example, if it is detected by both the region-based and the contour-based matching systems. This may result in an experimentally verifiably reduction in the false positive rate with an increase in the true positive detection rate.

Figure 18:
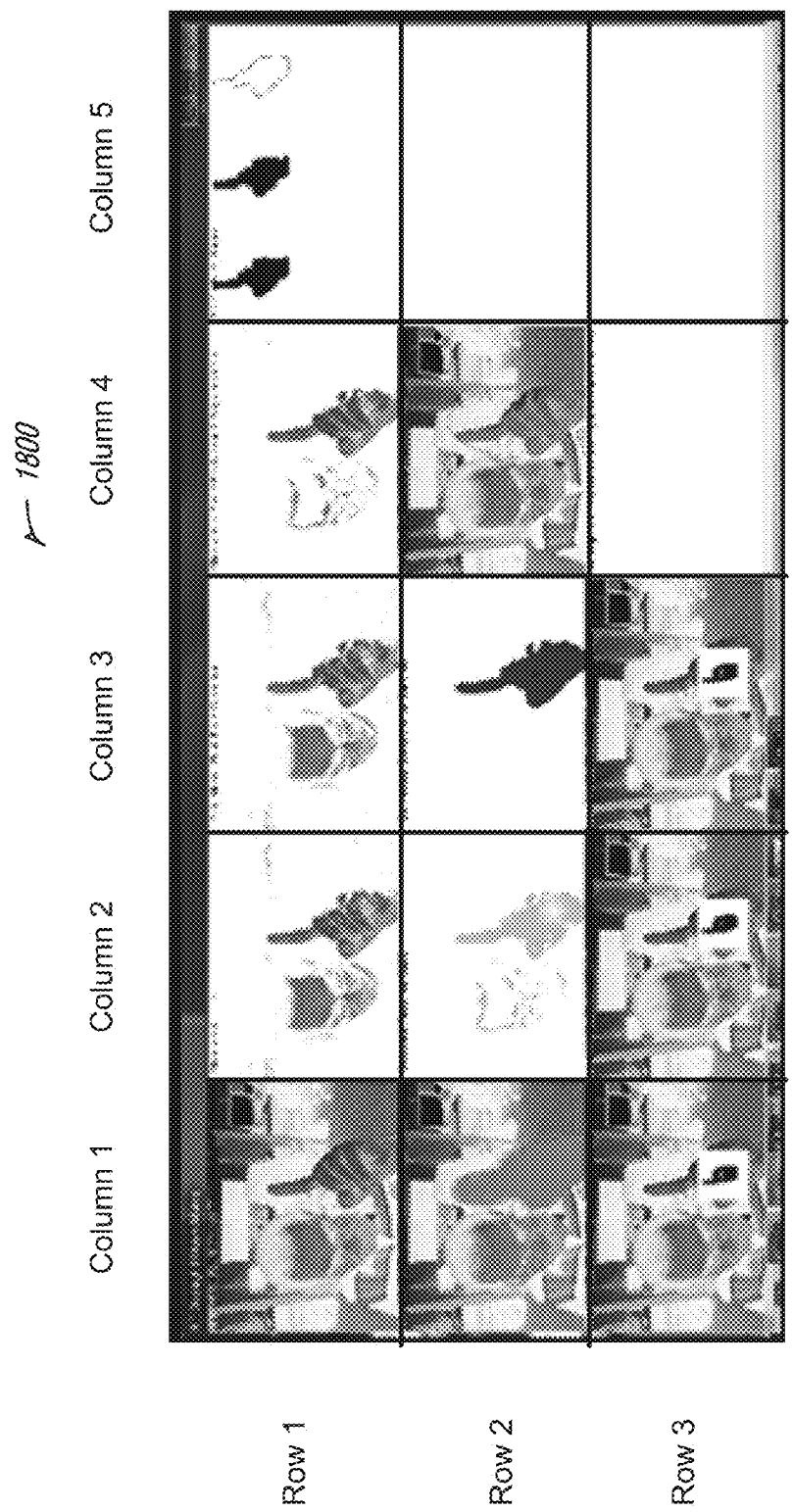
FIG. 18 illustrates generally a diagram showing results of operations for detecting a hand pose in accordance with some embodiments.

FIG. 18 illustrates generally a diagram 1800 showing results of operations for detecting a hand pose in accordance with some embodiments. FIG. 18 shows the various results of a technique for detecting the 'finger pointing' hand gestures. In the first row, the first column is the input frame. The second column in the first row is the result of the skin filter. The third column is the result of a head removal process that uses a face detection process. The fourth window is the result of the background subtraction system. The bit grid and Fourier descriptors associate with detected clusters are shown in the fifth column in the first row.

In the second row, the first column shows detected blob features. The second column shows point features associated with the detected blob features. The third column in the second row shows the connected components which are identified as part of a morphological clustering stage. The resulting clusters are shown in the fourth column. The fifth column in the second row is left blank. In the third row, the first two columns show the results of the region-based and contour-based matching processes, respectively. The result of the fusion stage is shown in the third column, and the last two columns in the third row are left blank.

Figure 19:
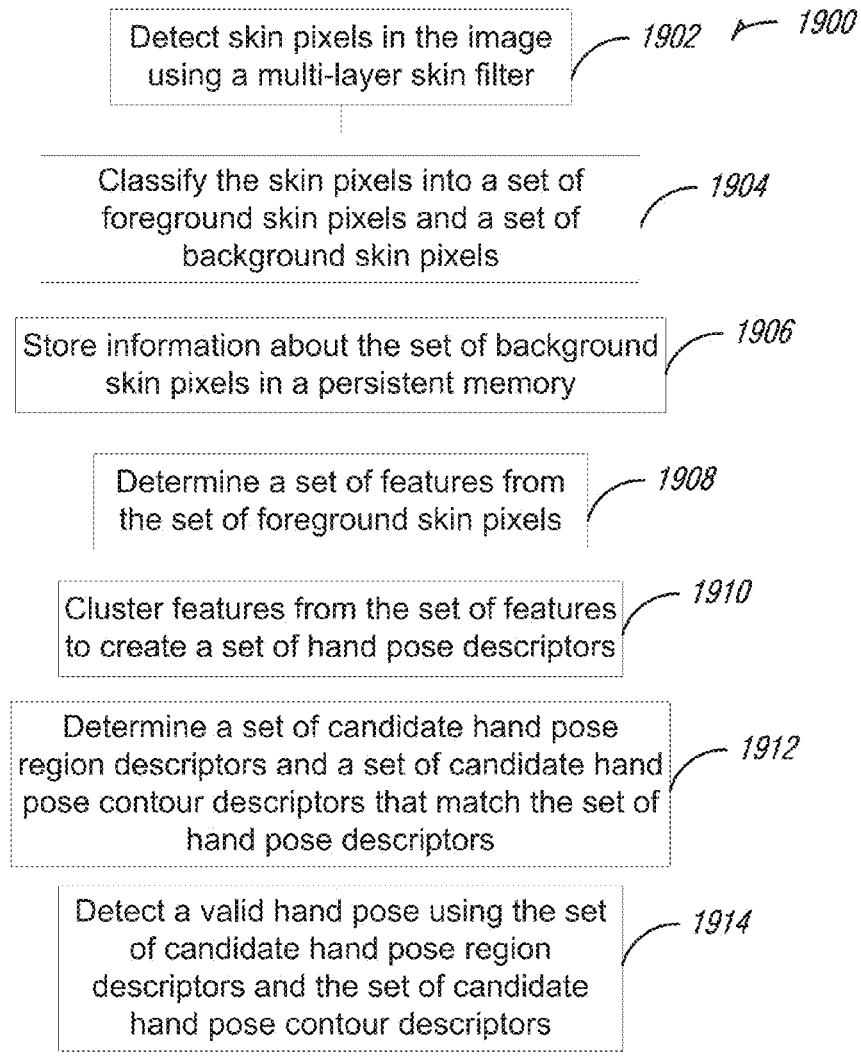
FIG. 19 illustrates generally flowchart showing a technique for skin detection and fused hand pose matching in accordance with some embodiments.

FIG. 19 illustrates generally flowchart showing a technique 1900 for skin detection and fused hand pose matching in accordance with some embodiments. The technique 1900 may include a method for skin detection and pose determination of a hand in an image, the method comprising: an operation 1902 to detect skin pixels in the image using a multi-layer skin filter. In an example, operation 1902 may include selecting the seed values during a user registration phase. The operation 1902 may include replacing the seed values with updated skin pixel values after expiration of a timer. In an example, detecting the set of skin pixels includes detecting the set of skin pixels using an expectation maximization including a probability density function as a linear combination of Gaussian functions or a skin locus as a union of a plurality of ellipse regions. In another example, detecting the set of skin pixels includes filtering out non-skin pixels from the plurality of pixels on multiple layers, and wherein a layer includes a unique luminance-invariant color space. In yet another example, a pixel in the plurality of pixels is in the set of skin pixels if the pixel is not filtered out in any layer of the multiple layers.

The technique 1900 may include an operation 1904 to classify the skin pixels into a set of foreground skin pixels and a set of background skin pixels. The technique 1900 may include an operation 1906 to store information about the set of background skin pixels in a persistent memory and an operation 1908 to determine a set of features from the set of foreground skin pixels. The operation 1906 may include classifying the skin pixels into the set of foreground skin pixels and the set of background skin pixels includes using a timer-based background subtraction process with the persistent memory. The operation 1908 may include wherein a feature in the set of features includes coordinates, a radius value, and a convolution score.

The technique 1900 may include an operation 1910 to cluster features from the set of features to create a set of hand pose descriptors. The operation 1910 may include creating the set of hand pose descriptors using k-means clustering, connected component labeling, or hierarchical clustering. In another example, operation 1908 includes clustering features by iteratively adding features to islands.

In an example, the technique 1900 includes an operation 1912 to determine a set of candidate hand pose region descriptors and a set of candidate hand pose contour descriptors that match set of the hand pose descriptors. In an example, operation 1912 includes determining the set of candidate hand pose region descriptors by: generating descriptors, converting the descriptors to hash streams, and determining the set of candidate hand pose region descriptors by comparing predetermined values to the hash streams. In an example, the descriptors may include bit grid descriptors or blob grid descriptors. In another example, operation 1912 includes determining the set of candidate hand pose contour descriptors by: tracing a boundary around a hand pose descriptor of the set of hand pose descriptors, extracting boundary descriptors of the boundary, applying a Fourier transform to the boundary descriptors, and determining the set of candidate hand pose contour descriptors using a trained Support Vector Machine and the Fourier transformed boundary descriptors.

In an example, the technique 1900 includes an operation 1914 to detect a valid hand pose using the set of candidate hand pose region descriptors and the set of candidate hand pose contour descriptors. Operation 1914 may include selecting the updated skin pixel values after expiration of a timer. In an example, operation 1914 includes detecting the valid hand pose only if the set of candidate hand pose region descriptors and the set of candidate hand pose contour descriptors both indicate the detected hand pose.

Figure 20:
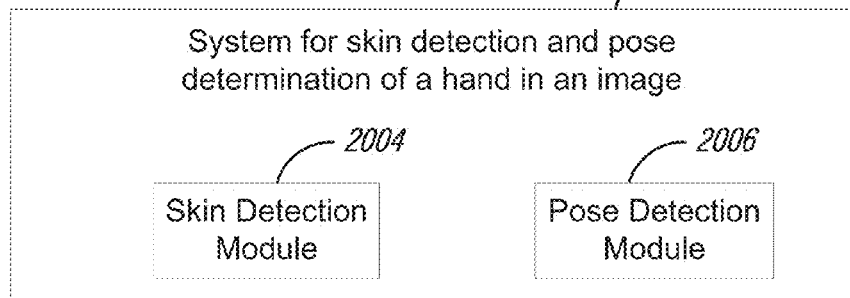
FIG. 20 illustrates generally a schematic drawing showing a skin detection and fused hand pose matching system in accordance with some embodiments.

FIG. 20 illustrates generally a schematic drawing showing a skin detection and fused hand pose matching system 2002 in accordance with some embodiments. The skin detection and fused hand pose matching system 2002 may include a skin detection module 2004 to: detect skin pixels in the image using a multi-layer skin filter, classify the skin pixels into a set of foreground skin pixels and a set of background skin pixels, and store information about the set of background skin pixels in a persistent memory. The skin detection and fused hand pose matching system 2002 may include a pose determination module 2006 to: determine a set of features from the set of foreground skin pixels, cluster features from the set of features to create a set of hand pose descriptors, determine, using the set of hand pose descriptors, a set of candidate hand pose region descriptors and a set of candidate hand pose contour descriptors that match the set of hand pose descriptors, and detect the valid hand pose using the set of candidate hand pose region descriptors and the set of candidate hand pose contour descriptors.

In an example, the skin detection module 2004 may use seed values. The seed values may be selected during a user registration phase. In an example, the skin detection module 2004 may replace the seed values with updated skin pixel values from the valid hand pose. The updated skin pixel values may be selected after expiration of a timer. The skin detection module 2004 may use an expectation maximization, the expectation maximization including a probability density function as a linear combination of Gaussian functions or a skin locus as a union of a plurality of ellipse regions. In another example, the skin detection module 2004 may filter out non-skin pixels from the plurality of pixels on multiple layers, wherein a layer includes a unique luminance-invariant color space. In an example, a pixel is in the set of skin pixels if the pixel is not filtered out in any layer of the multiple layers. In another example, the skin detection module 2004 may classify the skin pixels into the set of foreground skin pixels and the set of background skin pixels using a timer-based background subtraction process with the persistent memory.

In an example, the pose determination module 2006 may use k-means clustering, connected component labeling, or hierarchical clustering to create the set of hand pose descriptors. In another example, a feature in the set of features includes coordinates, a radius value, and a convolution score. In yet another example, the pose determination module 2006 may iteratively add features to islands. The pose determination module 2006 may determine the set of candidate hand pose region descriptors by generating descriptors, converting the descriptors to hash streams, and determining the set of candidate hand pose region descriptors by comparing predetermined values to the hash streams. In an example, the descriptors include bit grid descriptors or blob grid descriptors. The pose determination module 2006 may trace a boundary around a hand pose descriptor of the set of hand pose descriptors, extract boundary descriptors of the boundary, apply a Fourier transform to the boundary descriptors, and determine the set of candidate hand pose contour descriptors using a trained Support Vector Machine and the Fourier transformed boundary descriptors. In an example, the pose determination module 2006 may detect the valid hand pose, the pose determination module is to detect the valid hand pose when the set of candidate hand pose region descriptors and the set of candidate hand pose contour descriptors both indicate the valid hand pose.

Figure 21:
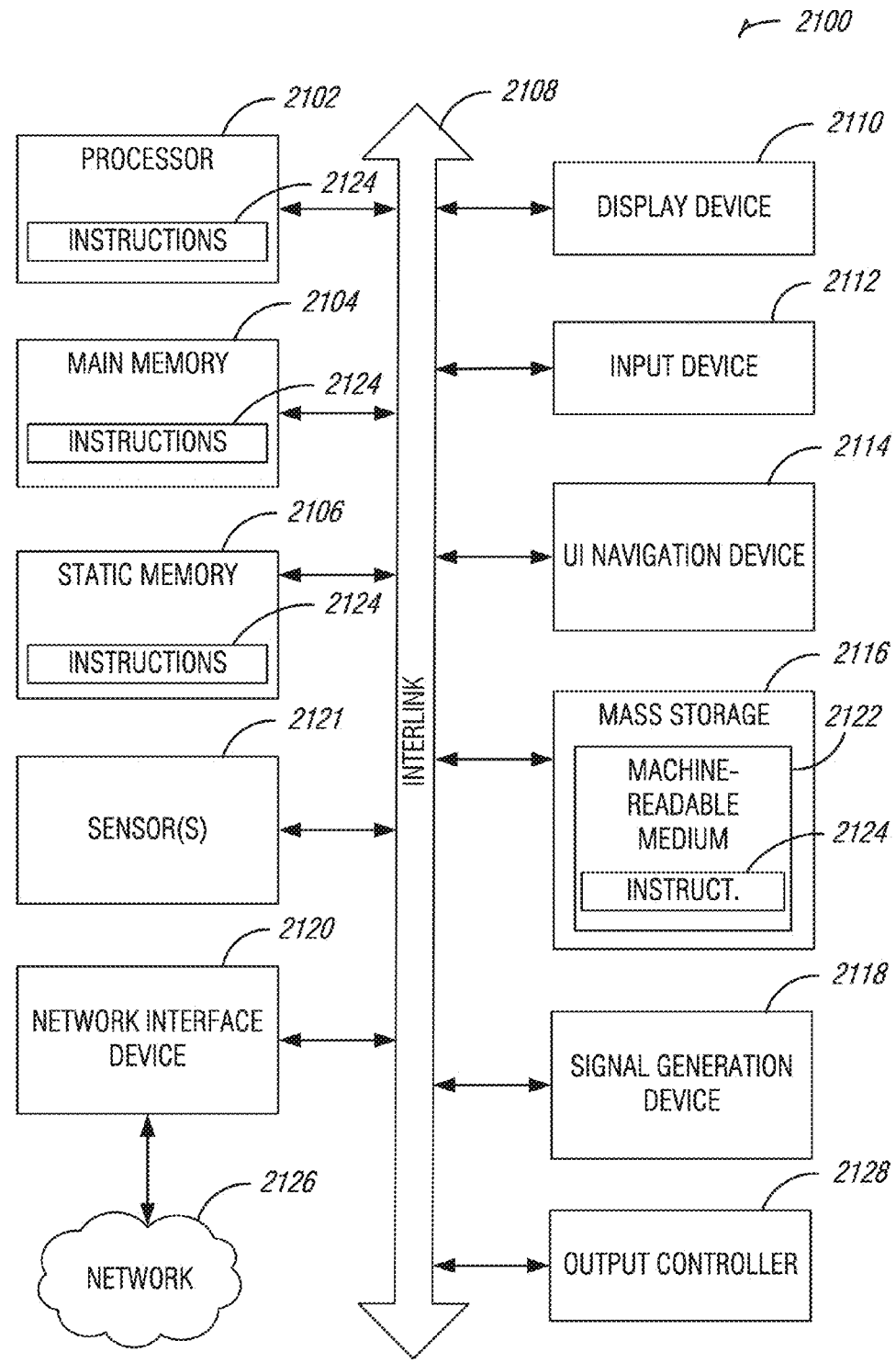
FIG. 21 illustrates generally an example of a block diagram of a machine upon which any one or more of the techniques (e.g., methodologies) discussed herein may perform in accordance with some embodiments.

FIG. 21 illustrates generally an example of a block diagram of a machine 2100 upon which any one or more of the techniques (e.g., methodologies) discussed herein may perform in accordance with some embodiments. In alternative embodiments, the machine 2100 may operate as a standalone device or may be connected (e.g., networked) to other machines. In a networked deployment, the machine 2100 may operate in the capacity of a server machine, a client machine, or both in server-client network environments. In an example, the machine 2100 may act as a peer machine in peer-to-peer (P2P) (or other distributed) network environment. The machine 2100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 2100 may include a hardware processor 2102 (e.g., a central processing unit (CPU), a graphics processing unit (GPU), a hardware processor core, or any combination thereof), a main memory 2104 and a static memory 2106, some or all of which may communicate with each other via an interlink (e.g., bus) 2108. The machine 2100 may further include a display unit 2110, an alphanumeric input device 2112 (e.g., a keyboard), and a user interface (UI) navigation device 2114 (e.g., a mouse). In an example, the display unit 2110, alphanumeric input device 2112 and UI navigation device 2114 may be a touch screen display. The machine 2100 may additionally include a storage device (e.g., drive unit) 2116, a signal generation device 2118 (e.g., a speaker), a network interface device 2120, and one or more sensors 2121, such as a global positioning system (GPS) sensor, compass, accelerometer, or other sensor. The machine 2100 may include an output controller 2128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 2116 may include a machine readable medium 2122 that is non-transitory on which is stored one or more sets of data structures or instructions 2124 (e.g., software) embodying or utilized by any one or more of the techniques or functions described herein. The instructions 2124 may also reside, completely or at least partially, within the main memory 2104, within static memory 2106, or within the hardware processor 2102 during execution thereof by the machine 2100. In an example, one or any combination of the hardware processor 2102, the main memory 2104, the static memory 2106, or the storage device 2116 may constitute machine readable media.

While the machine readable medium 2122 is illustrated as a single medium, the term "machine readable medium" may include a single medium or multiple media (e.g., a centralized or distributed database, and/or associated caches and servers) configured to store the one or more instructions 2124.

The term "machine readable medium" may include any medium that is capable of storing, encoding, or carrying instructions for execution by the machine 2100 and that cause the machine 2100 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 2124 may further be transmitted or received over a communications network 2126 using a transmission medium via the network interface device 2120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 2120 may include one or more physical jacks (e.g., Ethernet, coaxial, or phone jacks) or one or more antennas to connect to the communications network 2126. In an example, the network interface device 2120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 2100, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 includes the subject matter embodied by a system to detect a valid hand pose in an image, the system comprising: a skin detection module to: detect skin pixels in the image using a multi-layer skin filter, classify the skin pixels into a set of foreground skin pixels and a set of background skin pixels, and store information about the set of background skin pixels in a persistent memory, and a pose determination module to: determine a set of features from the set of foreground skin pixels, cluster features from the set of features to create a set of hand pose descriptors, determine, using the set of hand pose descriptors, a set of candidate hand pose region descriptors and a set of candidate hand pose contour descriptors that match the set of hand pose descriptors, and detect the valid hand pose using the set of candidate hand pose region descriptors and the set of candidate hand pose contour descriptors.

In Example 2, the subject matter of Example 1 may optionally include wherein to detect the set of skin pixels, the skin detection module is to use seed values.

In Example 3, the subject matter of one or any combination of Examples 1-2 may optionally include wherein the seed values are selected during a user registration phase.

In Example 4, the subject matter of one or any combination of Examples 1-3 may optionally include wherein the skin detection module is to replace the seed values with updated skin pixel values from the valid hand pose.

In Example 5, the subject matter of one or any combination of Examples 1-4 may optionally include wherein the updated skin pixel values are selected after expiration of a timer.

In Example 6, the subject matter of one or any combination of Examples 1-5 may optionally include wherein to detect the set of skin pixels, the skin detection module is to use an expectation maximization, the expectation maximization including a probability density function as a linear combination of Gaussian functions and a skin locus as a union of a plurality of ellipse regions.

In Example 7, the subject matter of one or any combination of Examples 1-6 may optionally include wherein to detect the set of skin pixels, the skin detection module is to filter out non-skin pixels from the plurality of pixels on multiple layers, wherein each layer of the multiple layers includes a unique luminance-invariant color space.

In Example 8, the subject matter of one or any combination of Examples 1-7 may optionally include wherein a pixel in the plurality of pixels is in the set of skin pixels if the pixel is not filtered out in any layer of the multiple layers.

In Example 9, the subject matter of one or any combination of Examples 1-8 may optionally include wherein the skin detection module is to classify the skin pixels into the set of foreground skin pixels and the set of background skin pixels using a timer-based background subtraction process with the persistent memory.

In Example 10, the subject matter of one or any combination of Examples 1-9 may optionally include wherein a feature in the set of features includes at least one of coordinates, a radius value, and a convolution score.

In Example 11, the subject matter of one or any combination of Examples 1-10 may optionally include wherein to create the set of hand pose descriptors, the pose determination module is to use k-means clustering.

In Example 12, the subject matter of one or any combination of Examples 1-11 may optionally include wherein to create the set of hand pose descriptors, the pose determination module is to use morphology operations or connected component labeling.

In Example 13, the subject matter of one or any combination of Examples 1-12 may optionally include wherein to create the set of hand pose descriptors, the pose determination module is to use greedy hierarchical clustering.

In Example 14, the subject matter of one or any combination of Examples 1-13 may optionally include wherein to cluster features, the pose determination module is to iteratively add features to an island.

In Example 15, the subject matter of one or any combination of Examples 1-14 may optionally include wherein to determine the set of candidate hand pose region descriptors, the pose determination module is to: generate descriptors, convert the descriptors to hash streams, and determine the set of candidate hand pose region descriptors by comparing predetermined values to the hash streams.

In Example 16, the subject matter of one or any combination of Examples 1-15 may optionally include wherein the descriptors include bit grid descriptors or blob grid descriptors.

In Example 17, the subject matter of one or any combination of Examples 1-16 may optionally include wherein to determine the set of candidate hand pose contour descriptors, the pose determination module is to: trace a boundary around a hand pose descriptor of the set of hand pose descriptors, extract boundary descriptors of the boundary, apply a Fourier transform to the boundary descriptors, and determine the set of candidate hand pose contour descriptors using a trained Support Vector Machine and the Fourier transformed boundary descriptors.

In Example 18, the subject matter of one or any combination of Examples 1-17 may optionally include wherein to detect the valid hand pose, the pose determination module is to detect the valid hand pose when the set of candidate hand pose region descriptors and the set of candidate hand pose contour descriptors both indicate the valid hand pose.

Example 19 includes the subject matter embodied by a method for skin detection and pose determination of a hand in an image, the method comprising: detecting skin pixels in the image using a multi-layer skin filter, classifying the skin pixels into a set of foreground skin pixels and a set of background skin pixels, storing information about the set of background skin pixels in a persistent memory, determining a set of features from the set of foreground skin pixels, clustering features from the set of features to create a set of hand pose descriptors, determining a set of candidate hand pose region descriptors and a set of candidate hand pose contour descriptors that match the set of hand pose descriptors, and detecting a valid hand pose using the set of candidate hand pose region descriptors and the set of candidate hand pose contour descriptors.

In Example 20, the subject matter of Example 19 may optionally include wherein detecting the set of skin pixels includes detecting the set of skin pixels using seed values.

In Example 21, the subject matter of one or any combination of Examples 19-20 may optionally include further comprising selecting the seed values during a user registration phase.

In Example 22, the subject matter of one or any combination of Examples 19-21 may optionally include further comprising replacing the seed values with updated skin pixel values from the valid hand pose.

In Example 23, the subject matter of one or any combination of Examples 19-22 may optionally include further comprising selecting the updated skin pixel values after expiration of a timer.

In Example 24, the subject matter of one or any combination of Examples 19-23 may optionally include wherein detecting the set of skin pixels includes detecting the set of skin pixels using an expectation maximization, the expectation maximization including a probability density function as a linear combination of Gaussian functions and a skin locus as a union of a plurality of ellipse regions.

In Example 25, the subject matter of one or any combination of Examples 19-24 may optionally include wherein detecting the set of skin pixels includes filtering out non-skin pixels from the plurality of pixels on multiple layers, and wherein each layer of the multiple layers includes a unique luminance-invariant color space.

In Example 26, the subject matter of one or any combination of Examples 19-25 may optionally include wherein a pixel in the plurality of pixels is in the set of skin pixels if the pixel is not filtered out in any layer of the multiple layers.

In Example 27, the subject matter of one or any combination of Examples 19-26 may optionally include wherein classifying the skin pixels into the set of foreground skin pixels and the set of background skin pixels includes using a timer-based background subtraction process with the persistent memory.

In Example 28, the subject matter of one or any combination of Examples 19-27 may optionally include wherein a feature in the set of features includes at least one of coordinates, a radius value, and a convolution score.

In Example 29, the subject matter of one or any combination of Examples 19-28 may optionally include wherein creating the set of hand pose descriptors includes using k-means clustering.

In Example 30, the subject matter of one or any combination of Examples 19-29 may optionally include wherein creating the set of hand pose descriptors includes using morphology operations or connected component labeling.

In Example 31, the subject matter of one or any combination of Examples 19-30 may optionally include wherein creating the set of hand pose descriptors includes using greedy hierarchical clustering.

In Example 32, the subject matter of one or any combination of Examples 19-31 may optionally include wherein clustering features includes iteratively adding features to an island.

In Example 33, the subject matter of one or any combination of Examples 19-32 may optionally include wherein determining the set of candidate hand pose region descriptors includes: generating descriptors, converting the descriptors to hash streams, and determining the set of candidate hand pose region descriptors by comparing predetermined values to the hash streams.

In Example 34, the subject matter of one or any combination of Examples 19-33 may optionally include wherein the descriptors include bit grid descriptors or blob grid descriptors.

In Example 35, the subject matter of one or any combination of Examples 19-34 may optionally include wherein determining the set of candidate hand pose contour descriptors includes: tracing a boundary around a hand pose descriptor of the set of hand pose descriptors, extracting boundary descriptors of the boundary, applying a Fourier transform to the boundary descriptors, and determining the set of candidate hand pose contour descriptors using a trained Support Vector Machine and the Fourier transformed boundary descriptors.

In Example 36, the subject matter of one or any combination of Examples 19-35 may optionally include wherein detecting the valid hand pose includes detecting the valid hand pose when the set of candidate hand pose region descriptors and the set of candidate hand pose contour descriptors both indicate the detected hand pose.

Example 37 includes at least one machine-readable medium including instructions for receiving information, which when executed by a machine, cause the machine to perform any of the methods of Examples 19-36.

Example 38 includes an apparatus comprising means for performing any of the methods of Examples 19-36.

Example 39 includes the subject matter embodied by an apparatus comprising: means for detecting skin pixels from a plurality of pixels in an image using a multi-layer skin filter, means for classifying the skin pixels into a set of foreground skin pixels and a set of background skin pixels, means for storing information about the set of background skin pixels in a persistent memory, means for determining a set of features from the set of foreground skin pixels, means for clustering features from the set of features to create a set of hand pose descriptors, means for determining a set of candidate hand pose region descriptors and a set of candidate hand pose contour descriptors that match the set of hand pose descriptors, and means for detecting a valid hand pose using the set of candidate hand pose region descriptors and the set of candidate hand pose contour descriptors.

In Example 40, the subject matter of Example 39 may optionally include wherein the means for detecting the set of skin pixels include means for detecting the set of skin pixels using seed values.

In Example 41, the subject matter of one or any combination of Examples 39-40 may optionally include further comprising means for selecting the seed values during a user registration phase.

In Example 42, the subject matter of one or any combination of Examples 39-41 may optionally include further comprising means for replacing the seed values with updated skin pixel values from the valid hand pose.

In Example 43, the subject matter of one or any combination of Examples 39-42 may optionally include further comprising means for selecting the updated skin pixel values after expiration of a timer.

In Example 44, the subject matter of one or any combination of Examples 39-43 may optionally include wherein the means for detecting the set of skin pixels include means for detecting the set of skin pixels using an expectation maximization, the expectation maximization including a probability density function as a linear combination of Gaussian functions and a skin locus as a union of a plurality of ellipse regions.

In Example 45, the subject matter of one or any combination of Examples 39-44 may optionally include wherein the means for detecting the set of skin pixels include means for filtering out non-skin pixels from the plurality of pixels on multiple layers, and wherein each layer of the multiple layers includes a unique luminance-invariant color space.

In Example 46, the subject matter of one or any combination of Examples 39-45 may optionally include wherein a pixel in the plurality of pixels is in the set of skin pixels if the pixel is not filtered out in any layer of the multiple layers.

In Example 47, the subject matter of one or any combination of Examples 39-46 may optionally include wherein the means for classifying the skin pixels into the set of foreground skin pixels and the set of background skin pixels include means for using a timer-based background subtraction process with the persistent memory.

In Example 48, the subject matter of one or any combination of Examples 39-47 may optionally include wherein a feature in the set of features includes at least one of coordinates, a radius value, and a convolution score.

In Example 49, the subject matter of one or any combination of Examples 39-48 may optionally include wherein the means for creating the set of hand pose descriptors include means for using k-means clustering.

In Example 50, the subject matter of one or any combination of Examples 39-49 may optionally include wherein the means for creating the set of hand pose descriptors include means for using morphology operations or connected component labeling.

In Example 51, the subject matter of one or any combination of Examples 39-50 may optionally include wherein the means for creating the set of hand pose descriptors include means for using greedy hierarchical clustering.

In Example 52, the subject matter of one or any combination of Examples 39-51 may optionally include wherein the means for clustering features include means for iteratively adding features to an island.

In Example 53, the subject matter of one or any combination of Examples 39-52 may optionally include wherein the means for determining the set of candidate hand pose region descriptors include: means for generating descriptors, means for converting the descriptors to hash streams, and means for determining the set of candidate hand pose region descriptors by comparing predetermined values to the hash streams.

In Example 54, the subject matter of one or any combination of Examples 39-53 may optionally include wherein the descriptors include bit grid descriptors or blob grid descriptors.

In Example 55, the subject matter of one or any combination of Examples 39-54 may optionally include wherein the means for determining the candidate hand pose contour includes: means for tracing a boundary around a hand pose descriptor of the set of hand pose descriptors, means for extracting boundary descriptors of the boundary, means for applying a Fourier transform to the boundary descriptors, and means for determining the set of candidate hand pose contour descriptors using a trained Support Vector Machine and the Fourier transformed boundary descriptors.

In Example 56, the subject matter of one or any combination of Examples 39-55 may optionally include wherein the means for detecting the valid hand pose include means for detecting the valid hand pose when the set of candidate hand pose region descriptors and the set of candidate hand pose contour descriptors both indicate the detected hand pose.

The above detailed description includes references to the accompanying drawings, which form a part of the detailed description. The drawings show, by way of illustration, specific embodiments. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations.

What is claimed is:

1. A system to detect a valid hand pose in an image, the system comprising:
   a processor coupled to memory, the processor to:
      detect skin pixels in the image using a multi-layer skin filter;
      classify the skin pixels into a set of foreground skin pixels and a set of background skin pixels;
      store information about the set of background skin pixels in a persistent memory;
      determine a set of features from the set of foreground skin pixels;
      cluster features from the set of features to create a set of hand pose descriptors;

determine a set of candidate hand pose region descriptors and a set of candidate hand pose contour descriptors that match the set of hand pose descriptors; and detect the valid hand pose using the set of candidate hand pose region descriptors and the set of candidate hand pose contour descriptors.

2. The system of claim 1, wherein to detect the set of skin pixels, the processor is to use seed values.

3. The system of claim 2, wherein the seed values are selected during a user registration phase.

4. The system of claim 3, wherein the processor is to replace the seed values with updated skin pixel values from the valid hand pose.

5. The system of claim 4, wherein the updated skin pixel values are selected after expiration of a timer.

6. The system of claim 1, wherein to detect the set of skin pixels, the processor is to use an expectation maximization, the expectation maximization including a probability density function as a linear combination of Gaussian functions and a skin locus as a union of a plurality of ellipse regions.

7. The system of claim 1, wherein to detect the set of skin pixels, the processor is to filter out non-skin pixels from the plurality of pixels on multiple layers, wherein each layer of the multiple layers includes a unique luminance-invariant color space.

8. The system of claim 7, wherein a pixel in the plurality of pixels is in the set of skin pixels if the pixel is not filtered out in any layer of the multiple layers.

9. The system of claim 1, wherein the processor is to classify the skin pixels into the set of foreground skin pixels and the set of background skin pixels using a timer-based background subtraction process with the persistent memory.

10. The system of claim 1, wherein a feature in the set of features includes at least one of coordinates, a radius value, and a convolution score.

11. The system of claim 1, wherein to create the set of hand pose descriptors, the processor is to use k-means clustering.

12. The system of claim 11, wherein to create the set of hand pose descriptors, the processor is to use morphology operations or connected component labeling.

13. The system of claim 11, wherein to create the set of hand pose descriptors, the processor is to use greedy hierarchical clustering.

14. The system of claim 13, wherein to cluster features, the processor is to iteratively add features to an island.

15. At least one non-transitory machine-readable medium including instructions for receiving information, which when executed by a machine, cause the machine to:
detect skin pixels in an image using a multi-layer skin filter;
classify the skin pixels into a set of foreground skin pixels and a set of background skin pixels;
store information about the set of background skin pixels in a persistent memory;
determine a set of features from the set of foreground skin pixels;
cluster features from the set of features to create a set of hand pose descriptors;
determine a set of candidate hand pose region descriptors and a set of candidate hand pose contour descriptors that match the set of hand pose descriptors; and
detect a valid hand pose using the set of candidate hand pose region descriptors and the set of candidate hand pose contour descriptors.

16. The at least one non-transitory machine-readable medium of claim 15, wherein operations to determine the set of candidate hand pose region descriptors include operations to:
generate descriptors;
convert the descriptors to hash streams; and
determine the set of candidate hand pose region descriptors by comparing predetermined values to the hash streams.

17. The at least one non-transitory machine-readable medium of claim 16, wherein the descriptors include bit grid descriptors or blob grid descriptors.

18. The at least one non-transitory machine-readable medium of claim 15, wherein operations to determine the set of candidate hand pose contour descriptors include operations to:
trace a boundary around a hand pose descriptor of the set of hand pose descriptors;
extract boundary descriptors of the boundary;
apply a Fourier transform to the boundary descriptors; and
determine the set of candidate hand pose contour descriptors using a trained Support Vector Machine and the Fourier transformed boundary descriptors.

19. The at least one non-transitory machine-readable medium of claim 15, wherein operations to detect the valid hand pose include operations to detect the valid hand pose when the set of candidate hand pose region descriptors and the set of candidate hand pose contour descriptors both indicate the detected hand pose.

20. The at least one non-transitory machine-readable medium of claim 15, wherein operations to detect the set of skin pixels include operations to filter out non-skin pixels from the plurality of pixels on multiple layers, and wherein each layer of the multiple layers includes a unique luminance-invariant color space.

21. The at least one non-transitory machine-readable medium of claim 20, wherein a pixel in the plurality of pixels is in the set of skin pixels if the pixel is not filtered out in any layer of the multiple layers.

22. The at least one non-transitory machine-readable medium of claim 15, wherein operations to classify the skin pixels into the set of foreground skin pixels and the set of background skin pixels include operations to classify the skin pixels using a timer-based background subtraction process with the persistent memory.

23. A method for skin detection and pose determination of a hand in an image, the method comprising:
detecting skin pixels in the image using a multi-layer skin filter;
classifying the skin pixels into a set of foreground skin pixels and a set of background skin pixels;
storing information about the set of background skin pixels in a persistent memory;
determining a set of features from the set of foreground skin pixels;
clustering features from the set of features to create a set of hand pose descriptors;
determining a set of candidate hand pose region descriptors and a set of candidate hand pose contour descriptors that match the set of hand pose descriptors; and
detecting a valid hand pose using the set of candidate hand pose region descriptors and the set of candidate hand pose contour descriptors.

24. The method of claim 23, wherein detecting the set of skin pixels includes detecting the set of skin pixels using seed values, and further comprising selecting the seed values during a user registration phase.

25. The method of claim 24, further comprising replacing the seed values with updated skin pixel values from the valid hand pose and selecting the updated skin pixel values after expiration of a timer.

* * * * *